US012555527B2

(12) United States Patent
Han et al.

(10) Patent No.: US 12,555,527 B2
(45) Date of Patent: Feb. 17, 2026

(54) PIXEL DRIVING CIRCUIT, PIXEL DRIVING METHOD AND DISPLAY APPARATUS

(71) Applicant: BOE TECHNOLOGY GROUP CO., LTD., Beijing (CN)

(72) Inventors: Ying Han, Beijing (CN); Pan Xu, Beijing (CN); Mingi Chu, Beijing (CN); Donghui Zhao, Beijing (CN); Xing Zhang, Beijing (CN); Chengyuan Luo, Beijing (CN); Guangshuang Lv, Beijing (CN); Miao Liu, Beijing (CN); Xing Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 18/288,451

(22) PCT Filed: Jan. 3, 2023

(86) PCT No.: PCT/CN2023/070060
§ 371 (c)(1),
(2) Date: Oct. 26, 2023

(87) PCT Pub. No.: WO2024/145735
PCT Pub. Date: Jul. 11, 2024

(65) Prior Publication Data

US 2024/0428731 A1 Dec. 26, 2024

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2310/08* (2013.01)

(58) Field of Classification Search
CPC .. G09G 3/3233; G09G 3/3266; G09G 3/3291; G09G 2310/08
See application file for complete search history.

(56) References Cited

U.S. PATENT DOCUMENTS 7,414,599 B2 * 8/2008 Chung ................ G09G 3/3233 315/169.3
2013/0050292 A1 2/2013 Mizukoshi
(Continued)

FOREIGN PATENT DOCUMENTS

CN 102982766 A 3/2013
CN 103440840 A 12/2013
(Continued)

OTHER PUBLICATIONS

Y. -H. Tai, L. -S. Chou, H. -L. Chiu and B. -C. Chen, "Three-Transistor AMOLED Pixel Circuit With Threshold Voltage Compensation Function Using Dual-Gate IGZO TFT," in IEEE Electron Device Letters, vol. 33, No. 3, pp. 393-395, Mar. 2012, doi: 10.1109/LED.2011.2179282 (Year: 2012).*
(Continued)

*Primary Examiner* — Bryan Earles
(74) *Attorney, Agent, or Firm* — HOUTTEMAN LAW LLC

(57) ABSTRACT

A pixel driving circuit is provided to include: a driving transistor; a data writing circuit configured to write a display data voltage from the data line to a first node in a display driving process, and sequentially write a sensing data voltage and a reset data voltage from the data line to the first node in a threshold voltage sensing process; a threshold compensation circuit configured to write a reference voltage from a reference voltage supply terminal to the first node and write a first compensation voltage to a second node in the display driving process, and write a second compensation voltage to the second node when a voltage at the first node
(Continued)

changes from the reference voltage to the display data voltage; a sensing circuit configured to write an initialization voltage from the sensing line to the second node in the threshold voltage sensing process; a light emitting element.

18 Claims, 14 Drawing Sheets

(56) References Cited

U.S. PATENT DOCUMENTS

| | | | | |
|---|---|---|---|---|
| 2015/0243203 | A1* | 8/2015 | Kim | G09G 3/2092<br>345/212 |
| 2015/0243720 | A1* | 8/2015 | Kwon | H10D 86/421<br>257/40 |
| 2016/0300532 | A1* | 10/2016 | Tan | G09G 3/3258 |
| 2020/0111414 | A1* | 4/2020 | Han | G09G 3/3233 |
| 2020/0335035 | A1* | 10/2020 | Gai | G09G 3/3266 |
| 2022/0199018 | A1 | 6/2022 | Jeon et al. | |
| 2023/0066613 | A1* | 3/2023 | Liu | G09G 3/3266 |
| 2023/0237965 | A1* | 7/2023 | Lin | H10K 59/1213<br>345/691 |
| 2024/0185782 | A1* | 6/2024 | Sakai | G09G 3/3233 |

FOREIGN PATENT DOCUMENTS

| | | | |
|---|---|---|---|
| CN | 104167177 | A | 11/2014 |
| CN | 104751784 | A | 7/2015 |
| CN | 104809989 | A | 7/2015 |
| CN | 106935192 | A | 7/2017 |
| CN | 108091302 | A | 5/2018 |
| CN | 108597449 | A | 9/2018 |
| CN | 109961728 | A | 7/2019 |
| CN | 110189701 | A | 8/2019 |
| CN | 111179853 | A | 5/2020 |
| CN | 114765011 | A | 7/2022 |
| KR | 20210045034 | A | 4/2021 |
| KR | 20210085233 | A | 7/2021 |
| WO | WO2022133812 | A1 | 6/2022 |

OTHER PUBLICATIONS

J. Xiao et al., "A New Pixel Circuit for Micro-Light Emitting Diode Displays With Pulse Hybrid Modulation Driving and Compensation," in IEEE Journal of the Electron Devices Society, vol. 12, pp. 1-6, 2024, doi: 10.1109/JEDS.2023.3332783. (Year: 2024).*

A. Nathan et al., "Amorphous silicon TFT circuit integration for OLED displays on glass and plastic," Proceedings of the IEEE 2003 Custom Integrated Circuits Conference, 2003., San Jose, CA, USA, 2003, pp. 215-222, doi: 10.1109/CICC.2003.1249392. (Year: 2012).*

Ono, Shinya & Miwa, Koichi & Maekawa, Yuichi & Tsujimura, Takatoshi. (2006). Shared Pixel Compensation Circuit for AM-OLED Displays. Asia Society for Information Display (ASID) 2006. (Year: 2006).*

Jae Pyo Lee, Jun Young Hwang, Byung Seong Bae. (2014). Journal of Semiconductor Technology and Science, 14(5), 594-600. (Year: 2014).*

* cited by examiner

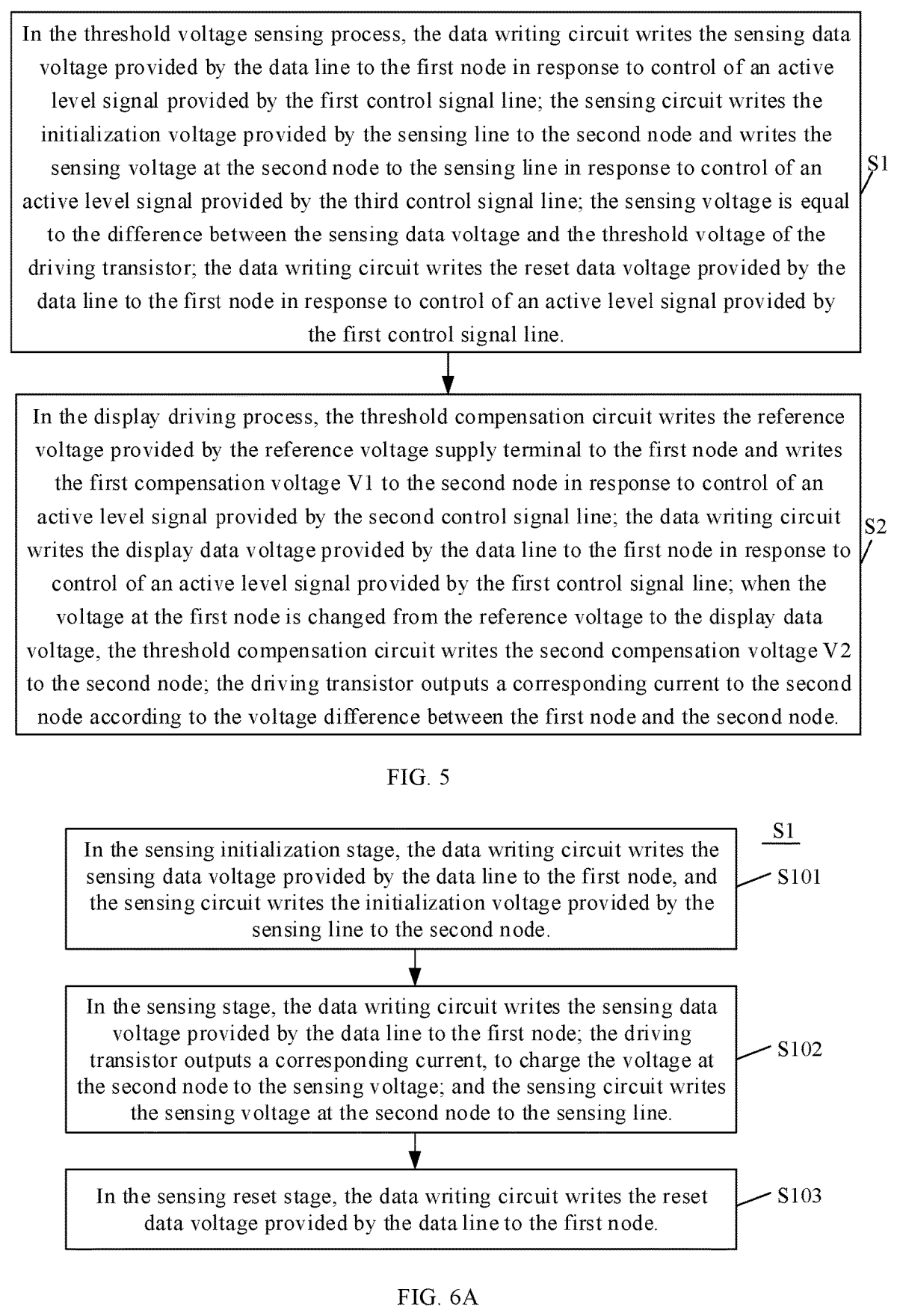

In the threshold voltage sensing process, the data writing circuit writes the sensing data voltage provided by the data line to the first node in response to control of an active level signal provided by the first control signal line; the sensing circuit writes the initialization voltage provided by the sensing line to the second node and writes the sensing voltage at the second node to the sensing line in response to control of an active level signal provided by the third control signal line; the sensing voltage is equal to the difference between the sensing data voltage and the threshold voltage of the driving transistor; the data writing circuit writes the reset data voltage provided by the data line to the first node in response to control of an active level signal provided by the first control signal line.

S1

In the display driving process, the threshold compensation circuit writes the reference voltage provided by the reference voltage supply terminal to the first node and writes the first compensation voltage V1 to the second node in response to control of an active level signal provided by the second control signal line; the data writing circuit writes the display data voltage provided by the data line to the first node in response to control of an active level signal provided by the first control signal line; when the voltage at the first node is changed from the reference voltage to the display data voltage, the threshold compensation circuit writes the second compensation voltage V2 to the second node; the driving transistor outputs a corresponding current to the second node according to the voltage difference between the first node and the second node.

S2

FIG. 5

S1

In the sensing initialization stage, the data writing circuit writes the sensing data voltage provided by the data line to the first node, and the sensing circuit writes the initialization voltage provided by the sensing line to the second node.

S101

In the sensing stage, the data writing circuit writes the sensing data voltage provided by the data line to the first node; the driving transistor outputs a corresponding current, to charge the voltage at the second node to the sensing voltage; and the sensing circuit writes the sensing voltage at the second node to the sensing line.

S102

In the sensing reset stage, the data writing circuit writes the reset data voltage provided by the data line to the first node.

S103

FIG. 6A

PIXEL DRIVING CIRCUIT, PIXEL DRIVING METHOD AND DISPLAY APPARATUS

TECHNICAL FIELD

The present disclosure relates to the field of display technology, and in particular to a pixel driving circuit, a pixel driving method, and a display apparatus.

BACKGROUND

An active matrix organic light emitting diode (AMOLED) panel has a wider and wider application. A pixel display device of the AMOLED is an organic light emitting diode (OLED). A driving current is generated by a driving transistor in a saturation state and drives a light emitting element to emit light, so that the AMOLED can emit light.

However, the uniformity of threshold voltages Vth of the driving transistors is poor or the organic light emitting diode is degraded due to the manufacturing process, which causes the problem of non-uniform brightness of the active matrix organic light emitting diode panel.

SUMMARY

In a first aspect, embodiments of the present disclosure provide a pixel driving circuit, including: a driving transistor, a data writing circuit, a threshold compensation circuit, a sensing circuit and a light emitting element, wherein a gate electrode of the driving transistor, the data writing circuit, and the threshold compensation circuit are connected to a first node; a second electrode of the driving transistor, the sensing circuit, the threshold compensation circuit, and the light emitting element are connected to a second node; and a first electrode of the driving transistor is connected to a first power terminal; the data writing circuit is connected to a first control signal line and a data line, and is configured to write a display data voltage from the data line to the first node in response to control of an active level signal from the first control signal line in a display driving process, and to sequentially write a sensing data voltage and a reset data voltage from the data line to the first node in response to control of an active level signal from the first control signal line in a threshold voltage sensing process; the threshold compensation circuit is connected to a reference voltage supply terminal and a second control signal line, and is configured to write a reference voltage from the reference voltage supply terminal to the first node and write a first compensation voltage to the second node in response to control of an active level signal from the second control signal line in the display driving process, and write a second compensation voltage to the second node in response to a voltage at the first node changing from the reference voltage to the display data voltage; the sensing circuit is connected to a third control signal line and a sensing line, and is configured to write an initialization voltage from the sensing line to the second node and write a sensing voltage at the second node to the sensing line in response to control of an active level signal from the third control signal line in the threshold voltage sensing process; and the driving transistor is configured to output a corresponding current to the second node according to a voltage difference between the first node and the second node.

In some embodiments, the first compensation voltage is V1, the second compensation voltage is V2; $V1=Vref-Vth$; $V2=V1+(Vdata-Vref)\times\alpha$; Vref is the reference voltage, Vth is a threshold voltage of the driving transistor, Vdata is the display data voltage, and $\alpha$ is a constant and $0<\alpha<1$.

In some embodiments, the sensing voltage is equal to a difference between the sensing data voltage and a threshold voltage of the driving transistor.

In some embodiments, the threshold voltage sensing process includes: a sensing initialization stage, a sensing stage and a sensing reset stage; the display driving process includes: a pixel reset stage, a compensation stage, a data writing stage and a light emitting stage; the data writing circuit is configured to write the sensing data voltage from the data line to the first node in response to control of an active level signal from the first control signal line in the sensing initialization stage and the sensing stage, to write the reset data voltage from the data line to the first node in response to control of an active level signal from the first control signal line in the sensing reset stage, and to write the display data voltage from the data line to the first node in response to control of an active level signal from the first control signal line in the data writing stage; the threshold compensation circuit is configured to write the reference voltage from the reference voltage supply terminal to the first node in response to control of an active level signal from the second control signal line in the pixel reset stage and the compensation stage, and to write the first compensation voltage to the second node in the compensation stage, and to write the second compensation voltage to the second node in response to the voltage at the first node changing from the reference voltage to the display data voltage in the data writing stage; and the sensing circuit is configured to write the initialization voltage from the sensing line to the second node in response to control of an active level signal from the third control signal line in the sensing initialization stage, and to write the sensing voltage at the second node to the sensing line in response to control of an active level signal from the third control signal line in the sensing stage.

In some embodiments, the sensing circuit is further configured to write the initialization voltage from the sensing line to the second node in response to control of an active level signal from the third control signal line in the sensing reset stage.

In some embodiments, the sensing circuit is further configured to write the initialization voltage from the sensing line to the second node in response to control of an active level signal from the third control signal line in the pixel reset stage.

In some embodiments, the pixel driving circuit further includes: a light emitting control circuit; wherein the first electrode of the driving transistor is connected to the first power terminal through the light emitting control circuit; and the light emitting control circuit is connected to a light emitting control line, and is configured to write a first operating voltage from the first power terminal to the first electrode of the driving transistor in response to control of an active level signal from the light emitting control line in the compensation stage and the light emitting stage, and to electrically disconnect the first electrode of the driving transistor from the first power terminal in response to control of an inactive level signal from the light emitting control line in the pixel reset stage and the data writing stage.

In some embodiments, the light emitting control circuit is further configured to write the first operating voltage from the first power terminal to the first electrode of the driving transistor in response to control of an active level signal from the light emitting control line in the sensing initialization stage, the sensing stage, and the sensing reset stage; and the threshold compensation circuit is further configured to electrically disconnect a reset voltage supply line from the first node in response to control of an inactive level signal from the light emitting control line in the sensing initialization stage, the sensing stage, and the sensing reset stage.

In some embodiments, the threshold compensation circuit includes: a second transistor, a first capacitor and a second capacitor; a control electrode of the second transistor is connected to the second control signal line, a first electrode of the second transistor is connected to the reference voltage supply terminal, and a second electrode of the second transistor is connected to the first node; a first terminal of the first capacitor is connected to the first node, and a second terminal of the first capacitor is connected to the second node; and a first terminal of the second capacitor is connected to the second node, and a second terminal of the second capacitor is connected to a second power terminal; $\alpha=c1/(c1+c2)$, c1 is a capacitance of the first capacitor, and c2 is a capacitance of the second capacitor.

In a second aspect, embodiments of the present disclosure provide a pixel driving method for a pixel driving circuit, wherein the pixel driving circuit includes: a driving transistor, a data writing circuit, a threshold compensation circuit, a sensing circuit and a light emitting element, wherein a gate electrode of the driving transistor, the data writing circuit, and the threshold compensation circuit are connected to a first node; a second electrode of the driving transistor, the sensing circuit, the threshold compensation circuit, and the light emitting element are connected to a second node; and a first electrode of the driving transistor is connected to a first power terminal; the data writing circuit is further connected to a first control signal line and a data line; the threshold compensation circuit is further connected to a second control signal line and a reference voltage supply terminal; and the sensing circuit is further connected to a third control signal line and a sensing line; the pixel driving method includes: in a display driving process, writing, by the threshold compensation circuit, a reference voltage provided by the reference voltage supply terminal to the first node and writing, by the threshold compensation circuit, a first compensation voltage to the second node in response to control of an active level signal provided by the second control signal line; writing, by the data writing circuit, the display data voltage provided by the data line to the first node in response to control of an active level signal provided by the first control signal line; writing, by the threshold compensation circuit, a second compensation voltage to the second node in response to a voltage at the first node changing from the reference voltage to the display data voltage; outputting, by the driving transistor, a corresponding current to the second node according to a voltage difference between the first node and the second node; and in a threshold voltage sensing process, writing, by the data writing circuit, a sensing data voltage provided by the data line to the first node in response to control of an active level signal provided by the first control signal line; writing, by the sensing circuit, an initialization voltage provided by the sensing line to the second node and writing, by the sensing circuit, the sensing voltage at the second node to the sensing line in response to control of an active level signal provided by the third control signal line; writing, by the data writing circuit, a reset data voltage provided by the data line to the first node in response to control of an active level signal provided by the first control signal line.

In some embodiments, the first compensation voltage is V1, the second compensation voltage is V2; $V1=Vref-Vth$; $V2=V1+(Vdata-Vref)\times\alpha$; Vref is the reference voltage, Vth is a threshold voltage of the driving transistor, Vdata is the display data voltage, and $\alpha$ is a constant and $0<\alpha<1$.

In some embodiments, the sensing voltage is equal to a difference between the sensing data voltage and a threshold voltage of the driving transistor.

In some embodiments, the threshold voltage sensing process includes: a sensing initialization stage, a sensing stage and a sensing reset stage; the display driving process includes: a pixel reset stage, a compensation stage, a data writing stage and a light emitting stage; the pixel driving method further includes: in the sensing initialization stage, writing, by the data writing circuit, the sensing data voltage provided by the data line to the first node in response to control of an active level signal provided by the first control signal line, and writing, by the sensing circuit, the initialization voltage provided by the sensing line to the second node in response to control of an active level signal provided by the third control signal line; in the sensing stage, writing, by the data writing circuit, the sensing data voltage provided by the data line to the first node in response to control of an active level signal provided by the first control signal line; outputting, by the driving transistor, a corresponding current to the second node according to the voltage difference between the first node and the second node, to charge the voltage at the second node to the sensing voltage; and writing, by the sensing circuit, the sensing voltage at the second node to the sensing line in response to control of an active level signal provided by the third control signal line, wherein the sensing voltage is equal to the difference between the sensing data voltage and the threshold voltage of the driving transistor; in the sensing reset stage, writing, by the data writing circuit, the reset data voltage provided by the data line to the first node in response to control of an active level signal provided by the first control signal line; in the pixel reset stage, writing, by the threshold compensation circuit, the reference voltage provided by the reference voltage supply terminal to the first node in response to control of an active level signal provided by the second control signal line; writing, by the sensing circuit, the initialization voltage provided by the sensing line to the second node in response to control of an active level signal provided by the third control signal line; in the compensation stage, writing, by the threshold compensation circuit, the reference voltage provided by the reference voltage supply terminal to the first node and writing, by the threshold compensation circuit, the first compensation voltage to the second node in response to control of an active level signal provided by the second control signal line; in the data writing stage, writing, by the data writing circuit, the display data voltage provided by the data line to the first node in response to control of an active level signal provided by the first control signal line, and writing, by the threshold compensation circuit, the second compensation voltage to the second node in response to the voltage at the first node changing from the reference voltage to the display data voltage; and in the light emitting stage, outputting, by the driving transistor, a corresponding driving current to the second node according to the voltage difference between the first node and the second node.

In some embodiments, the pixel driving method further includes: in the sensing reset stage, writing, by the sensing circuit, the initialization voltage provided by the sensing line to the second node in response to control of an active level signal provided by the third control signal line.

In some embodiments, the pixel driving method further includes: in the pixel reset stage, writing, by the sensing circuit, the initialization voltage provided by the sensing line to the second node in response to control of an active level signal provided by the third control signal line.

In some embodiments, the pixel driving circuit further includes: a light emitting control circuit; wherein the first electrode of the driving transistor is connected to the first power terminal through the light emitting control circuit; the light emitting control circuit is further connected to the light emitting control line; the pixel driving method further includes: in the pixel reset stage and the data writing stage, electrically disconnecting, by the light emitting control circuit, the first electrode of the driving transistor from the first power terminal in response to control of an inactive level signal from the light emitting control line; and the pixel driving method further includes: in the compensation stage and the light emitting stage, writing, by the light emitting control circuit, a first operating voltage from the first power terminal to the first electrode of the driving transistor in response to control of an active level signal from the light emitting control line.

In some embodiments, the pixel driving method further includes: in the sensing initialization stage, the sensing stage, and the sensing reset stage: writing, by the light emitting control circuit, the first operating voltage from the first power terminal to the first electrode of the driving transistor in response to control of an active level signal from the light emitting control line; and electrically disconnecting, by the threshold compensation circuit, a reset voltage supply line from the first node in response to control of an inactive level signal from the light emitting control line.

In some embodiments, the threshold compensation circuit includes: a second transistor, a first capacitor and a second capacitor; a control electrode of the second transistor is connected to the second control signal line, a first electrode of the second transistor is connected to the reference voltage supply terminal, and a second electrode of the second transistor is connected to the first node; a first terminal of the first capacitor is connected to the first node, and a second terminal of the first capacitor is connected to the second node; and a first terminal of the second capacitor is connected to the second node, and a second terminal of the second capacitor is connected to a second power terminal; $\alpha = c1/(c1+c2)$, c1 is a capacitance of the first capacitor, and c2 is a capacitance of the second capacitor.

In a third aspect, embodiments of the present disclosure provide a display apparatus, including: a display panel, wherein the display panel includes: a pixel arrangement region and a peripheral region at a periphery of the pixel arrangement region; a plurality of pixel units are in the pixel arrangement region; each pixel unit includes: the pixel driving circuit in the first aspect, and a light emitting element.

In some embodiments, all the pixel units in the pixel arrangement region are divided into a plurality of pixel unit groups sequentially arranged along a second direction, each pixel unit group includes pixel units sequentially arranged along a first direction, and the first direction intersects with the second direction; each pixel unit group is configured with one corresponding first control signal line and one corresponding third control signal line; the first control signal line and the third control signal line both extend along the first direction; and the pixel units in the same pixel unit group are connected to the same first control signal line and the same third control signal line; and each pixel unit in the pixel unit group corresponds to one corresponding data line and one corresponding sensing line; the data line and the sensing line extend along the second direction; and the pixel units in different pixel unit groups and arranged along the second direction are connected to the same data line and the same sensing line.

In some embodiments, the plurality of pixel unit groups include $i \times n$ pixel unit groups, where i and n are positive integers; the display panel further includes: a first gate driving circuit in the peripheral region; wherein the first gate driving circuit and the pixel arrangement region are arranged along the first direction; the first gate driving circuit is configured with $i \times n$ first signal output terminals in one-to-one correspondence with the first control signal lines, and connected to the corresponding first control signal lines; a second gate driving circuit in the peripheral region; wherein the second gate driving circuit and the pixel arrangement region are arranged along the first direction; the second gate driving circuit is configured with n second signal output terminals; each second signal output terminal corresponds to i different second control signal lines, and is connected to i corresponding second control signal lines; a third gate driving circuit in the peripheral region; wherein the third gate driving circuit and the pixel arrangement region are arranged along the first direction; the third gate driving circuit is configured with n third signal output terminals; each third signal output terminal corresponds to i different third control signal lines, and is connected to the i corresponding third control signal lines; an operation mode of the display apparatus includes a sensing mode; and in the sensing mode, the first signal output terminals of the first gate driving circuit sequentially output first control signal pulses in the active level state and each with a pulse width H1', and the third signal output terminals of the third gate driving circuit sequentially output third control signal pulses in the active level state and each with a pulse width H3'; where $H3' \geq i \times H1'$; a time interval between starting times of outputting the first control signal pulses from any two adjacent of the first signal output terminals is H1'; a time interval between starting times of outputting the third control signal pulses from any two adjacent of the third signal output terminals is $i \times H1'$, and a starting time of outputting the first control signal pulse from the $1^{st}$ first signal output terminal in the first gate driving circuit is the same as that of outputting the third control signal pulse from the $1^{st}$ third signal output terminal in the third gate driving circuit.

In some embodiments, the display apparatus further includes: a source driving chip including a plurality of data voltage output terminals in one-to-one correspondence with the data lines, and connected to the corresponding data lines; a sensing chip connected to each sensing line; and in the sensing mode, each data voltage output terminal of the source driving chip alternately outputs the sensing data voltage and the reset data voltage, and the sensing chip alternately outputs the initialization voltage to each sensing line and reads the sensing voltage through the sensing line; the total time length of outputting the sensing data voltage and the reset data voltage by the data voltage output terminal at one time is H1'; a starting time of outputting the sensing data voltage by the data voltage output terminal for the first time is the same as that of outputting the first control signal pulse by the $1^{st}$ first signal output terminal in the first gate driving circuit; a starting time of reading the sensing voltage by the sensing chip through the sensing line for the first time is after the starting time of outputting the sensing data voltage by the data voltage output terminal for the first time, and an ending time of reading the sensing voltage by the sensing chip through the sensing line for the first time is not later than that of outputting the sensing data voltage by the data voltage output terminal for the first time, and a read period of reading the sensing voltage by the sensing chip through the sensing line is H1'.

In some embodiments, the display panel further includes: a light emitting control gate driving circuit in the peripheral region; wherein the light emitting control gate driving circuit and the pixel arrangement region are arranged along the first direction; the light emitting control gate driving circuit is configured with n light emitting control signal output terminals; each light emitting control signal output terminal corresponds to i different light emitting control signal lines and is connected to the i corresponding light emitting control signal lines; the operation mode of the display apparatus includes a display mode; and in the display mode, the second signal output terminals of the second gate driving circuit sequentially output second control signal pulses in the active level state and each with a pulse width H2; the third signal output terminals of the third gate driving circuit sequentially output third control signal pulses in the active level state and each with a pulse width H3; the light emitting control signal output terminals of the light emitting control gate driving circuit sequentially output first light emitting control signal pulses in the inactive level state and each with a pulse width H4_1 and second light emitting control signal pulses in the inactive level state and each with a pulse width H4_2; the first signal output terminals of the first gate driving circuit sequentially output the first control signal pulses in the active level state and each with a pulse width H1; the data voltage output terminals of the source driving chip sequentially output the display data voltages required by the corresponding pixel units, and the sensing chip outputs the initialization voltages to the sensing lines; wherein a starting time of outputting the second control signal pulse from a $1^{st}$ second signal output terminal in the second gate driving circuit, a starting time of outputting the third control signal pulse from a $1^{st}$ third signal output terminal in the third gate driving circuit, and a starting time of outputting the first light emitting control signal pulses from a $1^{st}$ light emitting control signal output terminal in the light emitting control gate driving circuit are the same; and a starting time of outputting the first control signal pulse from the $1^{st}$ first signal output terminal in the first gate driving circuit is after an ending time of outputting the second control signal pulse from the $1^{st}$ second signal output terminal in the second gate driving circuit; a time length of outputting the display data voltage from the data voltage output terminal of the source driving chip at one time is H0; the time interval between the starting times of outputting the first control signal pulses from any two adjacent of the first signal output terminals is H0; a time interval between starting times of outputting the second control signal pulses from any two adjacent of the second signal output terminals, the time interval between the starting times of outputting the third control signal pulses from any two adjacent of the third signal output terminals, and a time interval between starting times of outputting the first light emitting control signal pulses from any two adjacent of the light emitting control signal output terminals are i×H0; a time length from an ending time of the first light emitting control signal pulse to a starting time of the second light emitting control signal pulse is H4_0; H0, H2, H3, H4_0, H4_1, 114_2 and H1 satisfy: H1≥H0, H4_1=H3, H4_0+H4_1=H2 and H4_2≥H1+(i−1)×H0.

In some embodiments, in the sensing mode, each of the second signal output terminals of the second gate driving circuit continuously outputs an inactive level signal; and each of the light emitting control signal output terminals of the light emitting control gate driving circuit continuously outputs an active level signal.

BRIEF DESCRIPTION OF DRAWINGS

FIG. 5 is a flowchart illustrating a pixel driving method according to embodiments of the present disclosure;

FIG. 6A is a flowchart of an alternative implementation of step S1 in FIG. 5;

DETAIL DESCRIPTION OF EMBODIMENTS

In order to enable one of ordinary skill in the art to better understand the technical solutions of the present disclosure, a pixel driving circuit, a pixel driving method, and a display apparatus provided by the present disclosure will be described in further detail with reference to the accompanying drawings.

The terms "first", "second", and the like used in embodiments of the present disclosure are not intended to indicate any order, quantity, or importance, but rather are used for distinguishing one element from another. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections.

Transistors used in the embodiments of the present disclosure may be thin film transistors or field effect transistors or other devices having the same characteristics. In the embodiments of the present disclosure, a drain electrode and a source electrode of each transistor may be interchangeable with each other, and therefore, the drain electrode and the source electrode of each transistor are indistinguishable in the embodiments of the present disclosure. Herein, only in order to distinguish two electrodes, except a control electrode (i.e., a gate electrode), of the transistor, one of the two electrodes is referred to as a drain electrode, and the other electrode is referred to as a source electrode. A transistor used in the embodiments of the present disclosure may be an N-type transistor or a P-type transistor. In the embodiments of the present disclosure, when an N-type transistor is used, a first electrode thereof may be a source electrode, and a second electrode thereof may be a drain electrode. In the following embodiments, as an example, the transistors are N-type transistors. That is, when the signal at the control electrode of the transistor is at a high level, the transistor is turned on. It is conceivable that when a P-type transistor is employed, a timing variation of a driving signal needs to be adjusted accordingly. Specific details are not set forth herein, but should be within the scope of the present disclosure.

In addition, an "active level" in the embodiments of the present disclosure refers to a level capable of controlling a transistor to be turned on, and an "inactive level" refers to a level capable of controlling a transistor to be turned off. For the N-type transistor, a high level is the active level, and a low level is the inactive level; for the P-type transistor, a low level is the active level and a high level is the inactive level. In the embodiments of the present disclosure, specific magnitudes of voltages of "the active level" and "the inactive level" are not limited.

Figure 1:
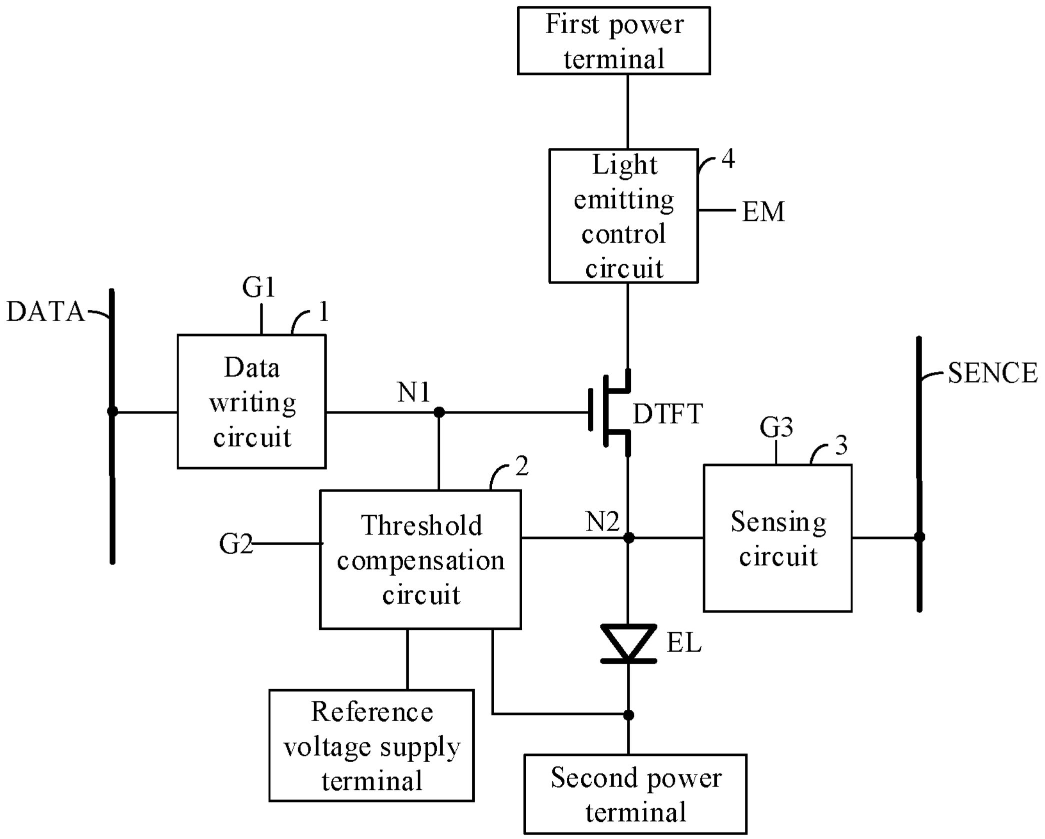
FIG. 1 is a schematic diagram of a circuit structure of a pixel driving circuit according to embodiments of the present disclosure.

FIG. 1 is a schematic diagram of a circuit structure of a pixel driving circuit according to embodiments of the present disclosure. As shown in FIG. 1, the pixel driving circuit is configured to drive a light emitting element EL, and includes: a driving transistor DTFT, a data writing circuit 1, a threshold compensation circuit 2, a sensing circuit 3, and the light emitting element EL; a gate electrode of the driving transistor DTFT, the data writing circuit 1, and the threshold compensation circuit 2 are connected to a first node N1; a second electrode of the driving transistor DTFT, the threshold compensation circuit 2, the sensing circuit 3, and the light emitting element EL are connected to a second node N2; and a first electrode of the driving transistor DTFT is connected to a first power terminal.

The data writing circuit 1 is connected to a first control signal line G1 and a data line DATA, and is configured to write a display data voltage provided by the data line DATA to the first node in response to control of an active level signal provided by the first control signal line G1 in a display driving process, and to sequentially write a sensing data voltage and a reset data voltage provided by the data line DATA to the first node N1 in response to control of an active level signal provided by the first control signal line G1 in a threshold voltage sensing process.

The threshold compensation circuit 2 is connected to a reference voltage supply terminal, a second control signal line G2, and is configured to write a reference voltage provided by the reference voltage supply terminal to the first node N1 and write a first compensation voltage V1 to the second node N2 in response to control of an active level signal provided by the second control signal line G2 in the display driving process, and write a second compensation voltage V2 to the second node when a voltage at the first node N1 changes from the reference voltage to the display data voltage.

In some embodiments, V1=Vref−Vth, V2=V1+(Vdata−Vref)×α, where Vref is a reference voltage, Vth is a threshold voltage of the driving transistor, Vdata is the display data voltage, and α is a constant and 0<α<1.

The sensing circuit 3 is connected to a third control signal line G3 and a sensing line SENCE, and is configured to write an initialization voltage provided by the sensing line SENCE to the second node N2 in response to control of an active level signal provided by the third control signal line G3 in the threshold voltage sensing process, and write a sensing voltage at the second node N2 to the sensing line SENCE in response to control of an active level signal provided by the third control signal line G3.

In some embodiments, the sensing voltage is equal to a difference between the sensing data voltage and the threshold voltage of the driving transistor DTFT.

The driving transistor DTFT is configured to output a corresponding current to the second node N2 according to a voltage difference between the first node N1 and the second node N2.

The pixel driving circuit provided by the embodiments of the present disclosure includes the display driving process and the threshold voltage sensing process. An internal compensation function may be realized in the display driving process, and the sensing of the threshold voltage (the threshold voltage sensing) may be realized in the threshold voltage sensing process for a subsequent external compensation.

In some embodiments, the threshold voltage sensing process includes: a sensing initialization stage, a sensing stage and a sensing reset stage; the display driving process includes: a pixel reset stage, a compensation stage, a data writing stage and a light emitting stage.

The data writing circuit 1 is specifically configured to write the sensing data voltage provided by the data line to the first node N1 in response to control of an active level signal provided by the first control signal line G1 in the sensing initialization stage and the sensing stage, to write the reset data voltage provided by the data line to the first node N1 in response to control of an active level signal provided by the first control signal line G1 in the sensing reset stage, and to write the display data voltage provided by the data line to the first node N1 in response to control of an active level signal provided by the first control signal line G1 in the data writing stage.

The threshold compensation circuit 2 is specifically configured to write the reference voltage provided by the reference voltage supply terminal to the first node N1 in response to control of an active level signal provided by the second control signal line G2 in the pixel reset stage and the compensation stage, and to write the first compensation voltage to the second node N2 in the compensation stage, and to write the second compensation voltage to the second node N2 when the voltage at the first node N1 changes from the reference voltage to the display data voltage in the data writing stage.

The sensing circuit 3 is specifically configured to write the initialization voltage provided by the sensing line to the second node N2 in response to control of an active level signal provided by the third control signal line G3 in the sensing initialization stage, and to write the sensing voltage at the second node N2 to the sensing line in response to control of an active level signal provided by the third control signal line G3 in the sensing stage.

The pixel driving circuit provided by the present disclosure may sense and output the threshold voltage of the driving transistor DTFT, and the sensing process includes a sensing initialization stage, a sensing stage, and a sensing reset stage, which are specifically as follows:

In the sensing initialization stage, the data writing circuit 1 writes the sensing data voltage provided by the data line DATA to the first node N1 in response to control of an active level signal provided by the first control signal line G1, and the sensing circuit 3 writes the initialization voltage provided by the sensing line SENCE to the second node N2 in response to control of an active level signal provided by the third control signal line G3.

In the sensing stage, the data writing circuit 1 writes the sensing data voltage provided by the data line DATA to the first node N1 in response to control of an active level signal provided by the first control signal line G1; the driving transistor DTFT outputs a corresponding current to the second node N2 according to the voltage difference between the first node N1 and the second node N2, so that the voltage at the second node N2 is charged to the sensing voltage; and the sensing circuit 3 writes the sensing voltage at the second node N2 to the sensing line SENCE in response to control of an active level signal provided by the third control signal line G3, the sensing voltage is equal to the difference between the sensing data voltage and the threshold voltage of the driving transistor DTFT.

In the sensing reset stage, the data writing circuit 1 writes the reset data voltage provided by the data line DATA to the first node N1 in response to control of an active level signal provided by the first control signal line G1.

The pixel driving circuit provided by the embodiments of the present disclosure may sense the threshold voltage of the driving transistor DTFT and obtain a sensing voltage, where the sensing voltage is equal to the difference between the sensing data voltage and the threshold voltage of the driving transistor DTFT; an external sensing chip may read the sensing voltage through the sensing line SENCE, and may obtain the threshold voltage of the driving transistor DTFT through the sensing voltage for further processing based on the threshold voltage of the driving transistor DTFT. For example, a drift condition of an electrical characteristic of the driving transistor DTFT is detected according to the obtained threshold voltage of the driving transistor DTFT, whether the driving transistor DTFT is abnormally operated or not is detected, or an external compensation scheme is provided according to the threshold voltage of the driving transistor DTFT. It should be noted that it is not limited in the technical solution of the present disclosure that the subsequent processing is performed based on the threshold voltage of the driving transistor DTFT acquired by the sensing voltage.

In the related art, generally, an actual driving current output to the light emitting element EL when the driving transistor DTFT is loaded with the display data voltage is collected based on the sensing line SENCE, and is then compared with a pre-stored ideal driving current corresponding to the display data voltage, and the threshold voltage of the driving transistor is evaluated based on the comparison result. In the method for obtaining the threshold voltage of the driving transistor in the related art, it is necessary to collect the output driving current when the driving transistor DTFT is loaded with the display data voltage, that is, the sensing of the threshold voltage necessarily occurs in a period for the driving current output when the driving transistor DTFT is loaded with the display data voltage (generally, in a blanking period designed between two adjacent frames). However, in order to ensure the display effect, the blanking period is generally short, so that the sensing of the threshold voltage may be performed on only one row of pixel units in the display panel in one blanking period. Therefore, assuming that the display panel includes P rows of pixel units, it takes P frames to complete the sensing of the threshold voltage for all the pixel units in the whole display panel. Therefore, the time for sensing the threshold voltage is greatly limited in the prior art, so that a global sensing of the threshold voltage is completed in the whole display panel once, which takes a long time.

However, the time for sensing the threshold voltage is not limited by the technical solution provided by the present application. For example, the sensing may occur in a power-on stage of a display apparatus, a display process (e.g., a blanking stage) of the display apparatus, a power-off stage of the display apparatus, or the like. Especially, in the power-on stage or the power-off stage of the display apparatus, a continuous sensing of the threshold voltage (see the contents in the following embodiments) may be performed on each row of pixel units in the whole display panel, and the time for completing one-time sensing of the global threshold voltage is shorter.

As an application scenario, after the display apparatus receives a power-off instruction, the display apparatus enters a sensing mode, the pixel driving circuits in the display apparatus undergo the threshold voltage sensing process; and after all the pixel driving circuits in the display apparatus complete the corresponding threshold voltage sensing process, the display apparatus enters a power-off state.

In some embodiments, the sensing circuit 3 is further configured to write the initialization voltage provided by the sensing line sense to the second node N2 in response to control of an active level signal provided by the third control signal line G3 in the sensing reset stage.

A principle of an internal compensation for the pixel driving circuit in the display driving process will be exemplarily described below in the embodiments of the present disclosure. With continued reference to FIG. 1, in some embodiments, the pixel driving circuit further includes: a light emitting control circuit 4; the first electrode of the driving transistor DTFT is connected to the first power terminal through the light emitting control circuit 4. The light emitting control circuit 4 is connected to a light emitting control line, and is configured to write a first operating voltage provided by the first power terminal to the first electrode of the driving transistor DTFT in response to control of an active level signal provided by the light emitting control line in the compensation stage and the light emitting stage, and to electrically disconnect the first electrode of the driving transistor DTFT from the first power terminal in response to control of an inactive level signal provided by the light emitting control line in the pixel reset stage and the data writing stage.

The sensing circuit 3 is further configured to write the initialization voltage provided by the sensing line SENCE to the second node N2 in response to control of an active level signal provided by the third control signal line G3 in the pixel reset stage.

The data writing circuit 1 is further configured to write the display data voltage provided by the data line DATA to the first node N1 in response to control of an active level signal provided by the first control signal line G1 in the data writing stage.

The first compensation voltage is V1, V1=Vref−Vth, Vref is a reference voltage, and Vth is a threshold voltage of the driving transistor DTFT.

The second compensation voltage is V2, V2=V1+(Vdata−Vref)×α, Vdata is a display data voltage, a is a constant, and 0<α<1.

The pixel driving circuit provided by the embodiments of the present disclosure not only has a function of sensing the threshold voltage of the driving transistor DTFT, but also has a function of performing the internal compensation on the threshold voltage of the driving transistor DTFT in the display process. The process of performing the internal compensation by the pixel driving circuit provided by the embodiments of the present disclosure on the threshold voltage of the driving transistor DTFT in the display process includes: the pixel reset stage, the compensation stage, the data writing stage and the light emitting stage.

In the pixel reset stage, the threshold compensation circuit 2 writes the reference voltage provided by the reference voltage supply terminal to the first node N1 in response to control of an active level signal provided by the second control signal line G2; the sensing circuit 3 writes the initialization voltage provided by the sensing line SENCE to the second node N2 in response to control of an active level signal provided by the third control signal line G3; and the light emitting control circuit 4 electrically disconnects the first electrode of the driving transistor DTFT from the first power terminal in response to control of an inactive level signal provided by the light emitting control line.

In the compensation stage, the light emitting control circuit 4 writes the first operating voltage provided by the first power terminal to the first electrode of the driving transistor DTFT in response to control of an active level signal provided by the light emitting control line; the threshold compensation circuit 2 writes the reference voltage provided by the reference voltage supply terminal to the first node N1 and writes the first compensation voltage to the second node N2 in response to control of an active level signal provided by the second control signal line G2; the first compensation voltage is V1, V1=Vref−Vth, Vref is the reference voltage, and Vth is the threshold voltage of the driving transistor DTFT.

In the data writing stage, the light emitting control circuit 4 electrically disconnects the first electrode of the driving transistor DTFT from the first power terminal in response to control of an inactive level signal provided by the light emitting control line; the data writing circuit 1 writes the display data voltage provided by the data line DATA to the first node N1 in response to control of an active level signal provided by the first control signal line G1; the threshold compensation circuit 2 writes the second compensation voltage to the second node N2 in response to the voltage at the first node N1 changing from the reference voltage to the display data voltage; the second compensation voltage is V2, V2=V1+(Vdata−Vref)×α, Vdata is the display data voltage, and a is a constant and 0<α<1.

At the end of the data writing stage, a gate-source voltage Vgs of the driving transistor DTFT is a difference between the voltages at the first node N1 and the second node N2:

$$\begin{aligned} Vgs &= Vdata - V2 \\ &= Vdata - [Vref - Vth + (Vdata - Vref) \times \alpha] = \\ &= (1-\alpha) \times (Vdata - Vref) + Vth \end{aligned}$$

In the light emitting stage, the light emitting control circuit 4 writes the first operating voltage provided by the first power terminal to the first electrode of the driving transistor DTFT in response to control of an active level signal provided by the light emitting control line, and the driving transistor DTFT outputs a corresponding driving current to the second node N2 according to the voltage difference between the first node N1 and the second node N2.

In the light emitting stage, the gate-source voltage of the driving transistor DTFT remains unchanged. The following may be derived according to the saturated driving current formula of the driving transistor DTFT:

$$\begin{aligned} I &= K*(Vgs - Vth)^2 \\ &= K*[(1-\alpha)*(Vdata - Vref) + Vth - Vth]^2 \\ &= K*(1-\alpha)^2*(Vdata - Vref)^2 \end{aligned}$$

Where K is a constant (having a magnitude related to the electrical characteristics of the driving transistor DTFT), and Vgs is the gate-source voltage of the driving transistor DTFT.

As can be seen from the above formula, the driving current of the driving transistor DTFT is related to the display data voltage Vdata and the reference voltage Vref, but is not related to the threshold voltage Vth of the driving transistor DTFT, so that the driving current flowing through the light emitting element EL is prevented from being affected by the non-uniformity and drift of the threshold voltage, and therefore, the uniformity of the driving current flowing through the light emitting element EL is effectively improved, that is, the internal compensation for the threshold voltage is realized.

In order to facilitate better understanding of the technical solution of the present disclosure by one of ordinary skill in the art, the following exemplary descriptions are provided in conjunction with the specific technical solution.

Figure 2:
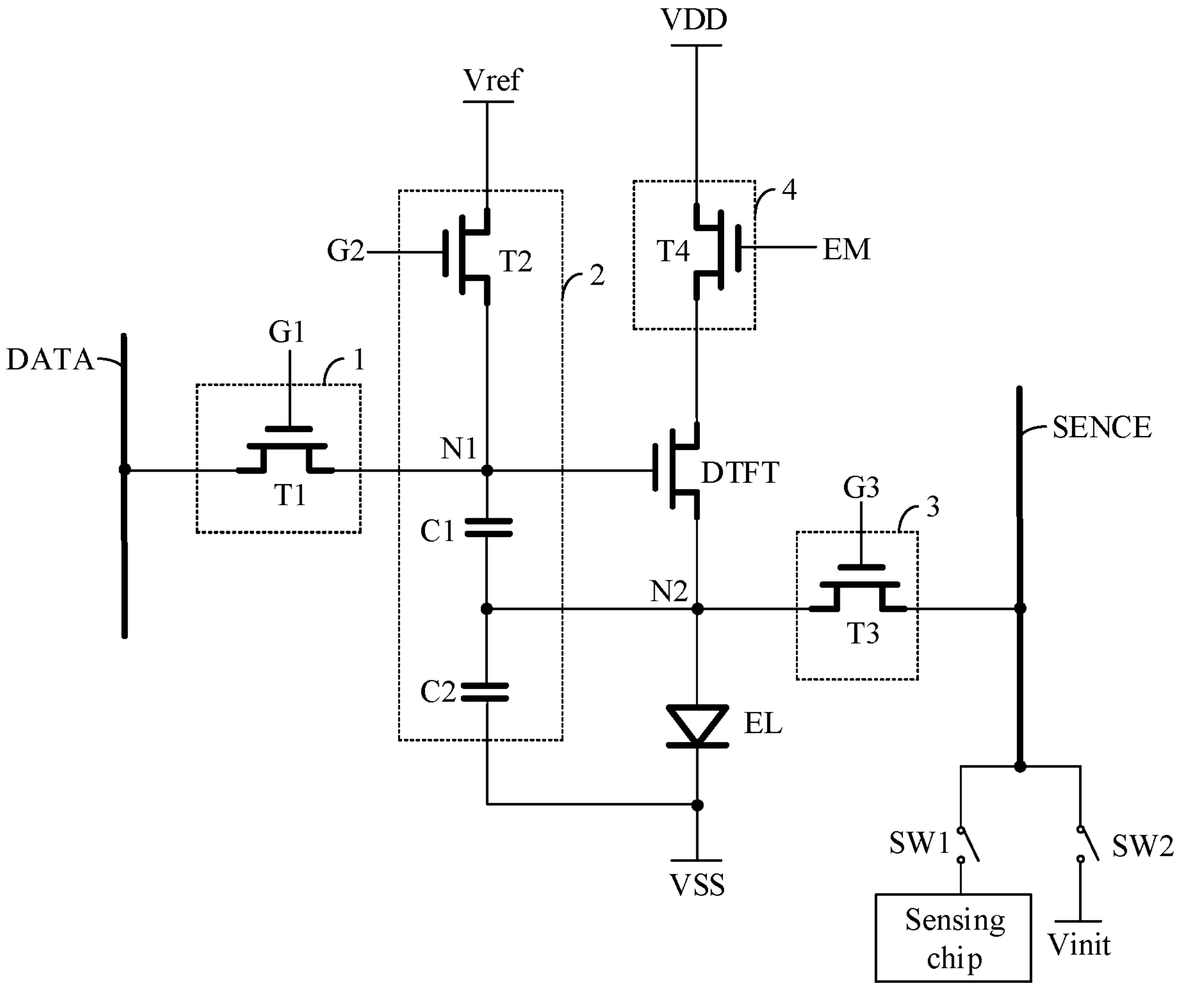
FIG. 2 is a schematic diagram of a circuit structure of a pixel driving circuit according to embodiments of the present disclosure.
Figure 3:
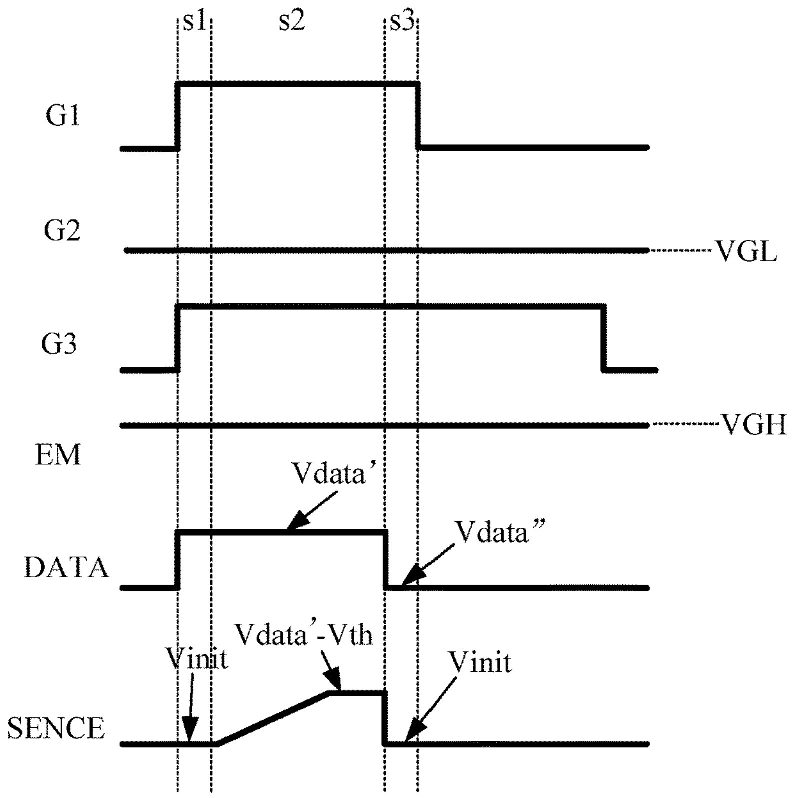
FIG. 3 is a timing diagram illustrating an operation of the pixel driving circuit in FIG. 2 in a threshold voltage sensing process.
Figure 4:
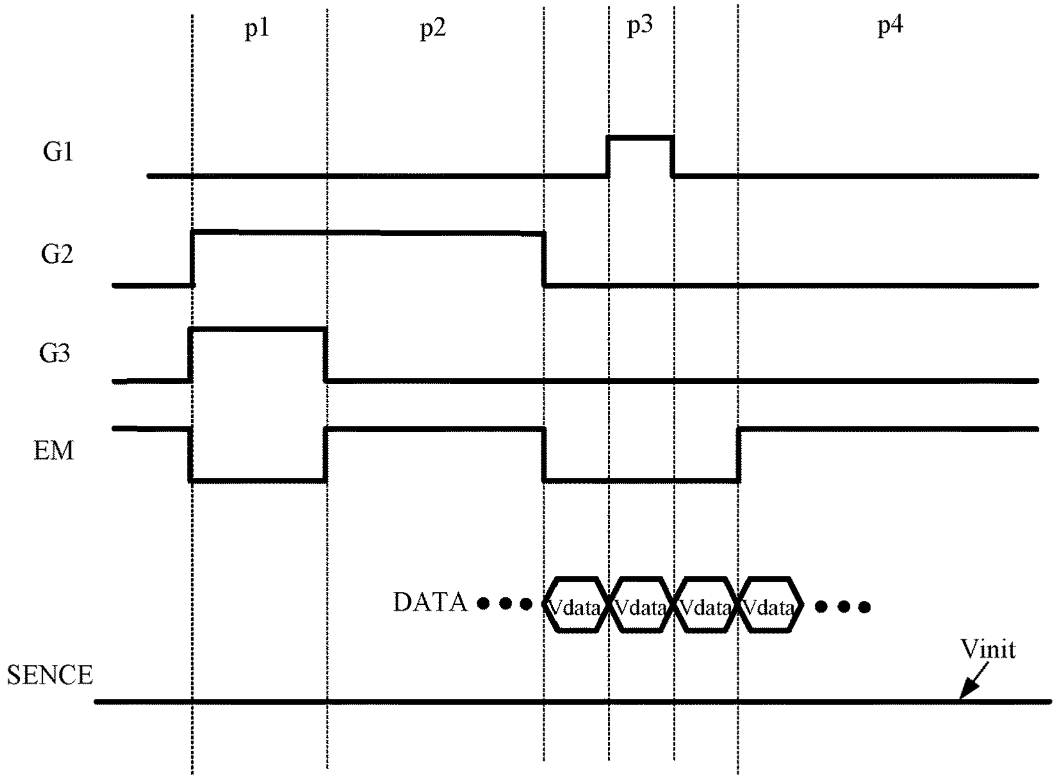
FIG. 4 is a timing diagram illustrating an operation of the pixel driving circuit in FIG. 2 in a display driving process.

FIG. 2 is a schematic diagram of a circuit structure of a pixel driving circuit according to embodiments of the present disclosure; FIG. 3 is a timing diagram illustrating an operation of the pixel driving circuit in FIG. 2 in a threshold voltage sensing process; FIG. 4 is a timing diagram illustrating an operation of the pixel driving circuit in FIG. 2 in a display driving process. As shown in FIGS. 2 to 4, in some embodiments, the data writing circuit 1 includes a first transistor T1; and the threshold compensation circuit 2 includes: a second transistor T2, a first capacitor C1 and a second capacitor C2; the sensing circuit 3 includes a third transistor T3; and the light emitting control circuit 4 includes a fourth transistor T4.

A control electrode of the first transistor T1 is connected to the first control signal line G1, a first electrode of the first transistor T1 is connected to the corresponding data line DATA, and a second electrode of the first transistor T1 is connected to the first node N1.

A control electrode of the second transistor T2 is connected to the second control signal line G2, a first electrode of the second transistor T2 is connected to the reference voltage supply terminal, and a second electrode of the second transistor T2 is connected to the first node N1.

A control electrode of the third transistor T3 is connected to the third control signal line G3, a first electrode of the third transistor T3 is connected to the second node N2, and a second electrode of the third transistor T3 is connected to the corresponding sensing line SENCE.

A control electrode of the fourth transistor T4 is connected to the light emitting control signal line EM, a first electrode of the fourth transistor T4 is connected to the first power terminal, and a second electrode of the fourth transistor T4 is connected to the first electrode of the driving transistor DTFT.

A first terminal of the first capacitor C1 is connected to the first node N1, and a second terminal of the first capacitor C1 is connected to the second node N2; a first terminal of the second capacitor C2 is connected to the second node N2, and a second terminal of the second capacitor C2 is connected to the second power terminal.

In some embodiments, $\alpha=c1/(c1+c2)$, c1 is a capacitance of the first capacitor C1, and c2 is a capacitance of the second capacitor C2.

As an example, the first power terminal provides the first operating voltage VDD, and the second power terminal provides the second operating voltage VSS.

The sensing line SENCE is connected to an external sensing chip through a first switch SW1, and is connected to an initialization voltage supply terminal through a second switch SW2. When the first switch SW1 and the second switch SW2 are both in an open state, the sensing line SENCE is in a floating state; when the first switch SW1 is in the open state and the second switch is in a closed state, the initialization voltage Vinit is loaded in the sensing line SENCE; when the first switch SW1 is in the closed state and the second switch is in the open state, the sensing line SENCE is connected to the sensing chip, so that the sensing chip may read the voltage loaded in the sensing line SENCE.

Referring to FIG. 3, the process of sensing the threshold voltage of the pixel driving circuit shown in FIG. 2 specifically includes: the sensing initialization stage, the sensing stage and the sensing reset stage.

In the sensing initialization stage s1, the first control signal line G1 provides a high level signal; the second control signal line G2 provides a low level signal; the third control signal line G3 provides a high level signal; the light emitting control signal line EM provides a high level signal; the data line DATA provides the sensing data voltage Vdata'; and the sensing line SENCE provides the initialization voltage Vinit; the first transistor T1, the third transistor T3, and the fourth transistor T4 are turned on, and the second transistor T2 is turned off.

At this time, the sensing data voltage Vdata' provided by the data line DATA is written to the first node N1 through the first transistor T1, and the initialization voltage Vinit provided by the sensing line SENCE is written to the second node N2 through the third transistor T3.

In the sensing stage s2, the first control signal line G1 provides a high level signal; the second control signal line G2 provides a low level signal; the third control signal line G3 provides a high level signal; the light emitting control signal line EM provides a high level signal; the data line DATA provides the sensing data voltage Vdata'; and the sensing line SENCE is in a floating state and the voltage loaded on the sensing line SENCE changes with the voltage at the second node N2. The first transistor T1, the third transistor T3, and the fourth transistor T4 are turned on, and the second transistor T2 is turned off.

At this time, the first transistor T1 continuously writes the sensing data voltage Vdata' to the first node N1, and the sensing line SENCE is in the floating state, so that the current output by the driving transistor DTFT charges the second node N2, and therefore, the voltage at the second node N2 rises. When the voltage at the second node N2 is equal to the difference between the sensing data voltage and the threshold voltage of the driving transistor DTFT, that is, the voltage at the second node N2 is the sensing voltage, the driving transistor DTFT is in an off state; accordingly, the third transistor T3 writes the sensing voltage at the second node N2 to the sensing line SENCE for the external sensing chip to read the sensing voltage through the sensing line SENCE.

In the sensing reset stage s3, the first control signal line G1 provides a high level signal; the second control signal line G2 provides a low level signal; the third control signal line G3 provides a high level signal; the light emitting control signal line EM provides a high level signal; the data line DATA provides the reset data voltage Vdata"; and the sensing line SENCE provides the initialization voltage Vinit. At this time, the first transistor T1, the third transistor T3, and the fourth transistor T4 are turned on, and the second transistor T2 is turned off.

At this time, the reset data voltage Vdata" provided by the data line DATA is written to the first node N1 through the first transistor T1, and the initialization voltage Vinit provided by the sensing line SENCE is written to the second node N2 through the third transistor T3.

It should be noted that in practical applications, pulse widths of the signal pulses provided by the first control signal line G1 and the third control signal line G3 in the active level state may be designed according to practical needs, as long as the first transistor T1 and the third transistor T3 may all be kept in the on state in the sensing initialization stage s1, the sensing stage s2, and the sensing reset stage s3.

Referring to FIG. 4, the display driving process for the pixel driving circuit shown in FIG. 2 specifically includes: the pixel reset stage p1, the compensation stage p2, the data writing stage p3, and the light emitting stage p4; the sensing line SENCE always provides the initialization voltage.

In the pixel reset stage p1, the first control signal line G1 provides a low level signal; the second control signal line G2 provides a high level signal; the third control signal line G3 provides a high level signal; and the light emitting control signal line EM provides a low level signal; the second transistor T2 and the third transistor T3 are both turned on, and the first transistor T1 and the fourth transistor T4 are both turned off.

At this time, the reference voltage is written to the first node N1 through the second transistor T2, and the initialization voltage is written to the second node N2 through the third transistor T3. A voltage difference between the two terminals of the first capacitor (i.e., the voltage difference between the first node N1 and the second node N2) is Vref-Vinit.

In the compensation stage p2, the first control signal line G1 provides a low level signal; the second control signal line G2 provides a high level signal; the third control signal line G3 provides a low level signal; and the light emitting control signal line EM provides a high level signal; the second transistor T2 and the fourth transistor T4 are both turned on, and the first transistor T1 and the third transistor T3 are both turned off.

At this time, the second transistor T2 continuously writes the reference voltage to the first node N1, and the fourth transistor T4 is turned on, so that the driving transistor DTFT may output a current to charge the second node N2. When the voltage at the second node N2 is charged to the difference between the reference voltage and the threshold voltage, that is, the voltage at the second node N2 is the first compensation voltage V1=Vref−Vth, the driving transistor DTFT is turned off. The voltage difference between the two terminals of the first capacitor (i.e., the voltage difference between the first node N1 and the second node N2) is Vth.

In the data writing stage p3, the first control signal line G1 provides a high level signal; the second control signal line G2 provides a low level signal; the third control signal line G3 provides a low level signal; and the light emitting control signal line EM provides a low level signal; the first transistor T1 is turned on, and the second, third and fourth transistors T2, T3 and T4 are all turned off.

The display data voltage Vdata is written to the first node N1 through the first transistor T1 and the voltage at the first node N1 is Vdata. At this time, under the bootstrap action of the first capacitor and the voltage division action of the second capacitor, the voltage at the second node N2 is pulled up from the first compensation voltage to the second compensation voltage, that is, the voltage at the second node N2 is pulled up from Vref−Vth to Vref−Vth+[c1/(c1+c2)]×(Vdata−Vref), and the voltage difference between the two terminals of the first capacitor (i.e., the voltage difference between the first node N1 and the second node N2) is [1−c1/(c+c2)]×(Vdata−Vref)+Vth.

In the light emitting stage p4, the first control signal line G1 provides a low level signal; the second control signal line G2 provides a low level signal; the third control signal line G3 provides a low level signal; and the light emitting control signal line EM provides a high level signal. The fourth transistor T4 is turned on, and the first transistor T1, the second transistor T2, and the third transistor T3 are all turned off.

In the light emitting stage, the gate-source voltage of the driving transistor DTFT remains unchanged. The following may be derived according to the saturated driving current formula of the driving transistor DTFT:

$$
\begin{aligned}
I &= K*(Vgs - Vth)^2 \\
&= K*\{[1 - c1/(c1 + c2)]*(Vdata - Vref) + Vth - Vth\}^2 \\
&= K*[1 - c1/(c1 + c2)]^2*(Vdata - Vref)^2
\end{aligned}
$$

Where K is a constant (having a magnitude related to the electrical characteristics of the driving transistor DTFT), and Vgs is the gate-source voltage of the driving transistor DTFT.

As can be seen from the above formula, the driving current of the driving transistor DTFT is related to the display data voltage Vdata, the reference voltage Vref, the capacitance c1 of the first capacitor, and the capacitance c2 of the second capacitor, but is not related to the threshold voltage Vth of the driving transistor DTFT, so that the driving current flowing through the light emitting element EL is prevented from being affected by the non-uniformity and drift of the threshold voltage, and therefore, the uniformity of the driving current flowing through the light emitting element EL is effectively improved, that is, the internal compensation for the threshold voltage is realized.

Based on the same inventive concept, the embodiments of the present disclosure further provide a pixel driving method. FIG. 5 is a flowchart illustrating a pixel driving method according to embodiments of the present disclosure. As shown in FIG. 5, the pixel driving method provided in the embodiments of the present disclosure is based on the pixel driving circuit provided in the previous embodiments, and for the specific description of the pixel driving circuit, reference may be made to the contents in the previous embodiments, which is not repeated herein; the pixel driving method provided by the embodiments of the present disclosure includes the threshold voltage sensing process (step S1) and the display driving process (step S2). The order to perform the threshold voltage sensing process and the display driving process is not limited herein.

In step S1, in the threshold voltage sensing process, the data writing circuit writes the sensing data voltage provided by the data line to the first node in response to control of an active level signal provided by the first control signal line; the sensing circuit writes the initialization voltage provided by the sensing line to the second node and writes the sensing voltage at the second node to the sensing line in response to control of an active level signal provided by the third control signal line; the data writing circuit writes the reset data voltage provided by the data line to the first node in response to control of an active level signal provided by the first control signal line.

In some embodiments, the sensing voltage is equal to the difference between the sensing data voltage and the threshold voltage of the driving transistor.

In step S2, in the display driving process, the threshold compensation circuit writes the reference voltage provided by the reference voltage supply terminal to the first node and writes the first compensation voltage V1 to the second node in response to control of an active level signal provided by the second control signal line; the data writing circuit writes the display data voltage provided by the data line to the first node in response to control of an active level signal provided by the first control signal line; when the voltage at the first node is changed from the reference voltage to the display data voltage, the threshold compensation circuit writes the second compensation voltage V2 to the second node; the driving transistor outputs a corresponding current to the second node according to the voltage difference between the first node and the second node.

In some embodiments, V1=Vref−Vth, V2=V1+(Vdata−Vref)×α, where Vref is the reference voltage, Vth is the threshold voltage of the driving transistor, Vdata is the display data voltage, and α is a constant and 0<α<1.

FIG. 6A is a flowchart of an alternative implementation of step S1 in FIG. 5. As shown in FIG. 6A, in some embodiments, step S1 includes the following steps S101 to S103.

In step S101, in the sensing initialization stage, the data writing circuit writes the sensing data voltage provided by the data line to the first node in response to control of an active level signal provided by the first control signal line, and the sensing circuit writes the initialization voltage provided by the sensing line to the second node in response to control of an active level signal provided by the third control signal line.

In step S102, in the sensing stage, the data writing circuit writes the sensing data voltage provided by the data line to the first node in response to control of an active level signal provided by the first control signal line; the driving transistor outputs a corresponding current to the second node according to the voltage difference between the first node and the second node, to charge the voltage at the second node to the sensing voltage; and the sensing circuit writes the sensing voltage at the second node to the sensing line in response to control of an active level signal provided by the third control signal line, wherein the sensing voltage is equal to the difference between the sensing data voltage and the threshold voltage of the driving transistor.

In step S103, in the sensing reset stage, the data writing circuit writes the reset data voltage provided by the data line to the first node in response to control of an active level signal provided by the first control signal line.

In some embodiments, step S103 further includes: writing, by the sensing circuit, the initialization voltage provided by the sensing line to the second node in response to control of an active level signal provided by the third control signal line.

For the specific description of the above steps S101 to S103, reference may be made to the contents in the foregoing embodiments, and details are not repeated here.

Figure 6B:
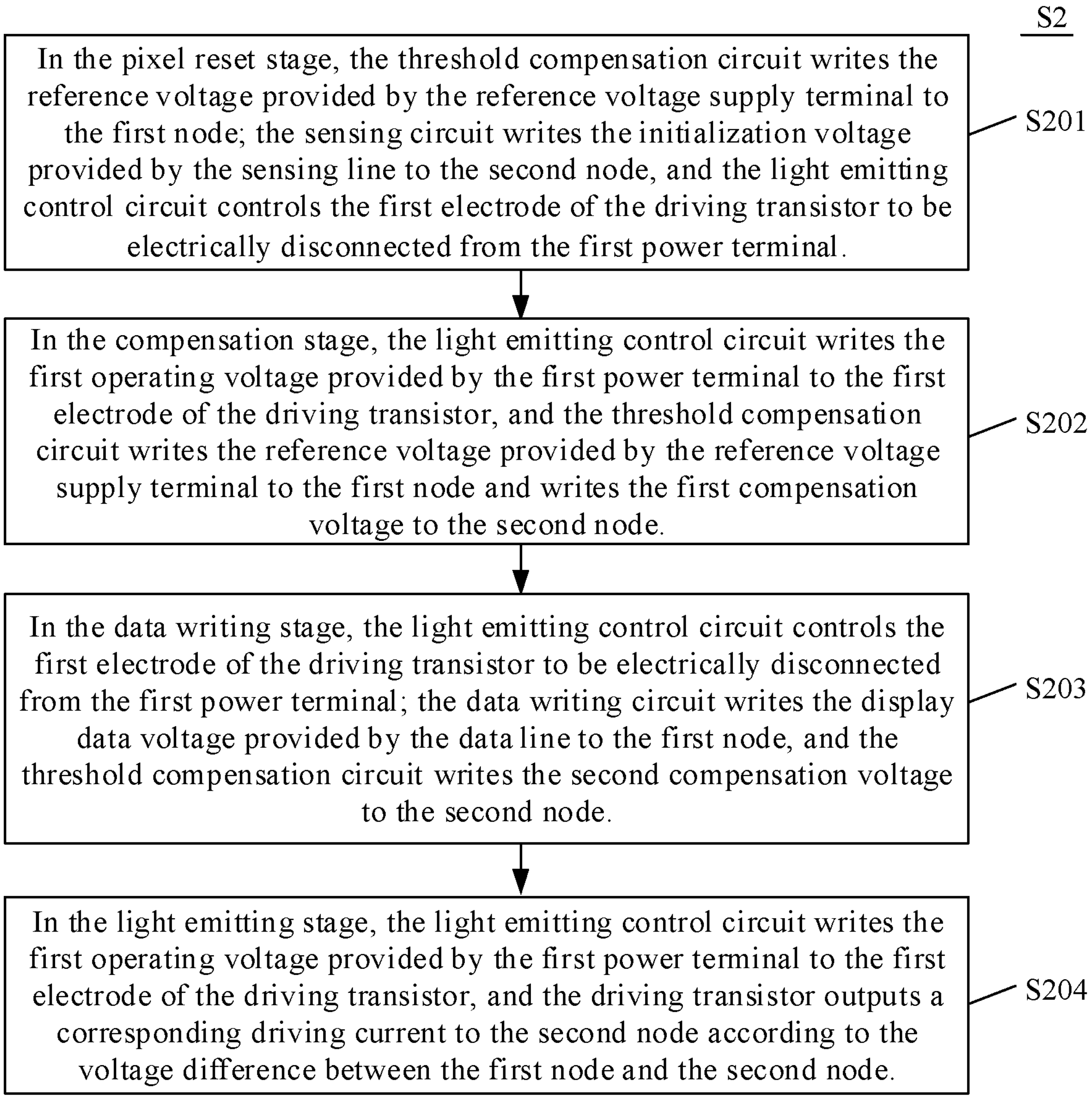
FIG. 6B is a flowchart of an alternative implementation of step S2 in FIG. 5.

FIG. 6B is a flowchart of an alternative implementation of step S2 in FIG. 5. As shown in FIG. 6B, in some embodiments, step S2 includes the following steps S201 to S204.

In step S201, in the pixel reset stage, the threshold compensation circuit writes the reference voltage provided by the reference voltage supply terminal to the first node in response to control of an active level signal provided by the second control signal line; the sensing circuit writes the initialization voltage provided by the sensing line to the second node in response to control of an active level signal provided by the third control signal line, and the light emitting control circuit electrically disconnects the first electrode of the driving transistor from the first power terminal in response to control of an inactive level signal provided by the light emitting control line.

In step S202, in the compensation stage, the light emitting control circuit writes the first operating voltage provided by the first power terminal to the first electrode of the driving transistor in response to control of an active level signal provided by the light emitting control line, and the threshold compensation circuit writes the reference voltage provided by the reference voltage supply terminal to the first node and writes the first compensation voltage to the second node in response to control of an active level signal provided by the second control signal line.

The first compensation voltage is V1, $V1=Vref-Vth$, Vref is the reference voltage, and Vth is the threshold voltage of the driving transistor.

In step S203, in the data writing stage, the light emitting control circuit electrically disconnects the first electrode of the driving transistor from the first power terminal in response to control of an inactive level signal provided by the light emitting control line; the data writing circuit writes the display data voltage provided by the data line to the first node in response to control of an active level signal provided by the first control signal line, and the threshold compensation circuit writes the second compensation voltage to the second node in response to the voltage at the first node changing from the reference voltage to the display data voltage.

The second compensation voltage is V2, $V2=V1+(Vdata-Vref)\times\alpha$, Vdata is the display data voltage, a is a constant and $0<\alpha<1$.

In some embodiments, the threshold compensation circuit includes: the second transistor, the first capacitor and the second capacitor; a control electrode of the second transistor is connected to the second control signal line; a first electrode of the second transistor is connected to the reference voltage supply terminal, and a second electrode of the second transistor is connected to the first node; a first terminal of the first capacitor is connected to the first node, and a second terminal of the first capacitor is connected to the second node; a first terminal of the second capacitor is connected to the second node, and a second terminal of the second capacitor is connected to the second power terminal; at this time, $\alpha=c1/(c1+c2)$, c1 is the capacitance of the first capacitor, and c2 is the capacitance of the second capacitor.

In step S204, in the light emitting stage, the light emitting control circuit writes the first operating voltage provided by the first power terminal to the first electrode of the driving transistor in response to control of an active level signal provided by the light emitting control line, and the driving transistor outputs a corresponding driving current to the second node according to the voltage difference between the first node and the second node.

For the specific description of the steps S201 to S403, reference may be made to the contents in the foregoing embodiments, and details are not repeated here.

In some embodiments, each of step S101, step S102, and step S103 further includes: writing, by the light emitting control circuit, the first operating voltage provided by the first power terminal to the first electrode of the driving transistor in response to control of an active level signal provided by the light emitting control line, and electrically disconnecting a reset voltage supply line from the first node by the threshold compensation circuit in response to control of an inactive level signal provided by the light emitting control line.

It should be noted that the steps S201 to S204 may be performed before or after the steps S101 to S103; or the steps S201 to S204 may be performed several times in succession, and then the steps S101 to S103 may be performed; or the steps S201 to S204 and the steps S101 to S103 may be performed alternately. The sequence of performing the steps S101 to S103 and S201 to S204 is not limited in the technical solution of the present disclosure.

Figure 7:
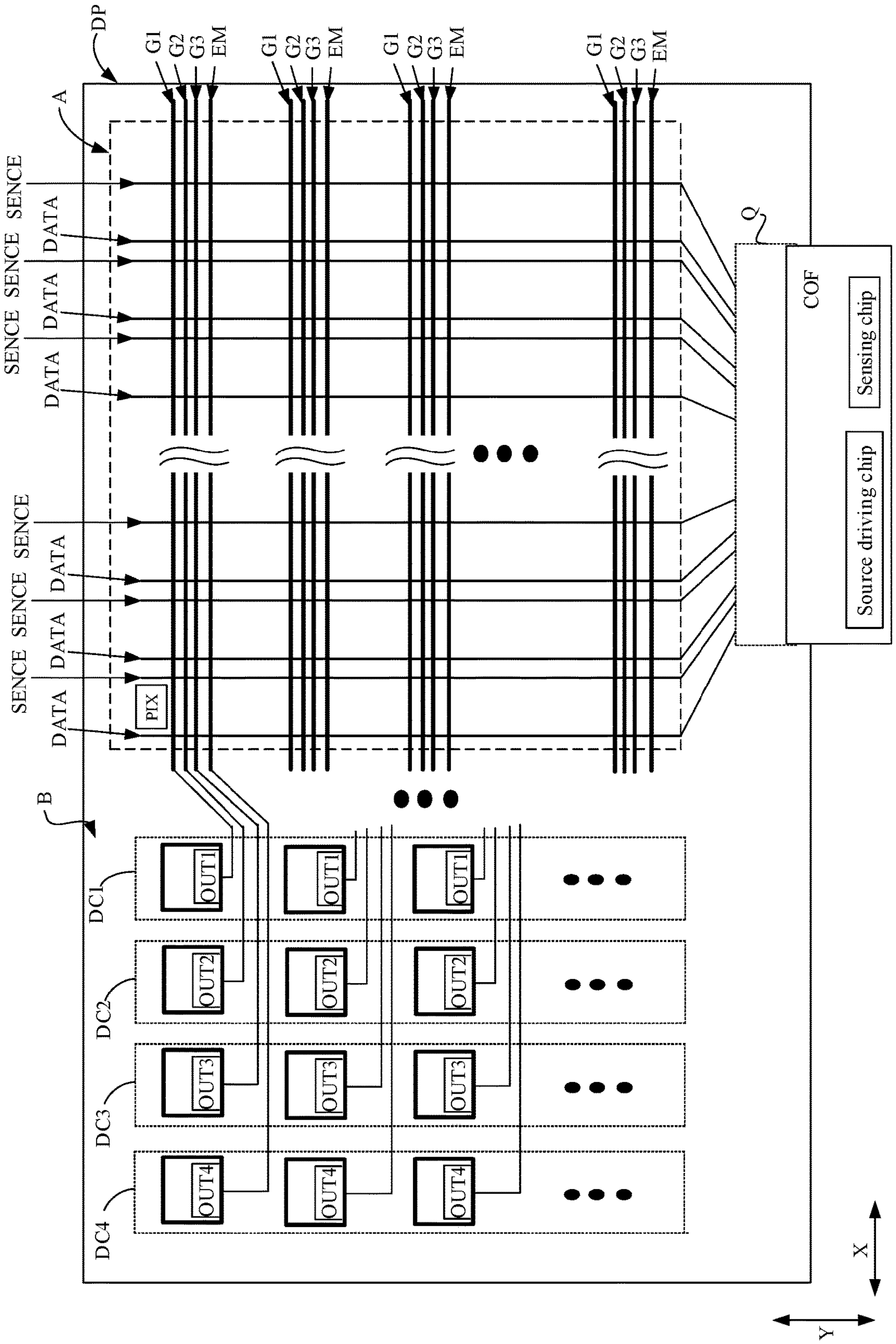
FIG. 7 is a schematic diagram of a structure of a display apparatus according to embodiments of the present disclosure.
Figure 8A:
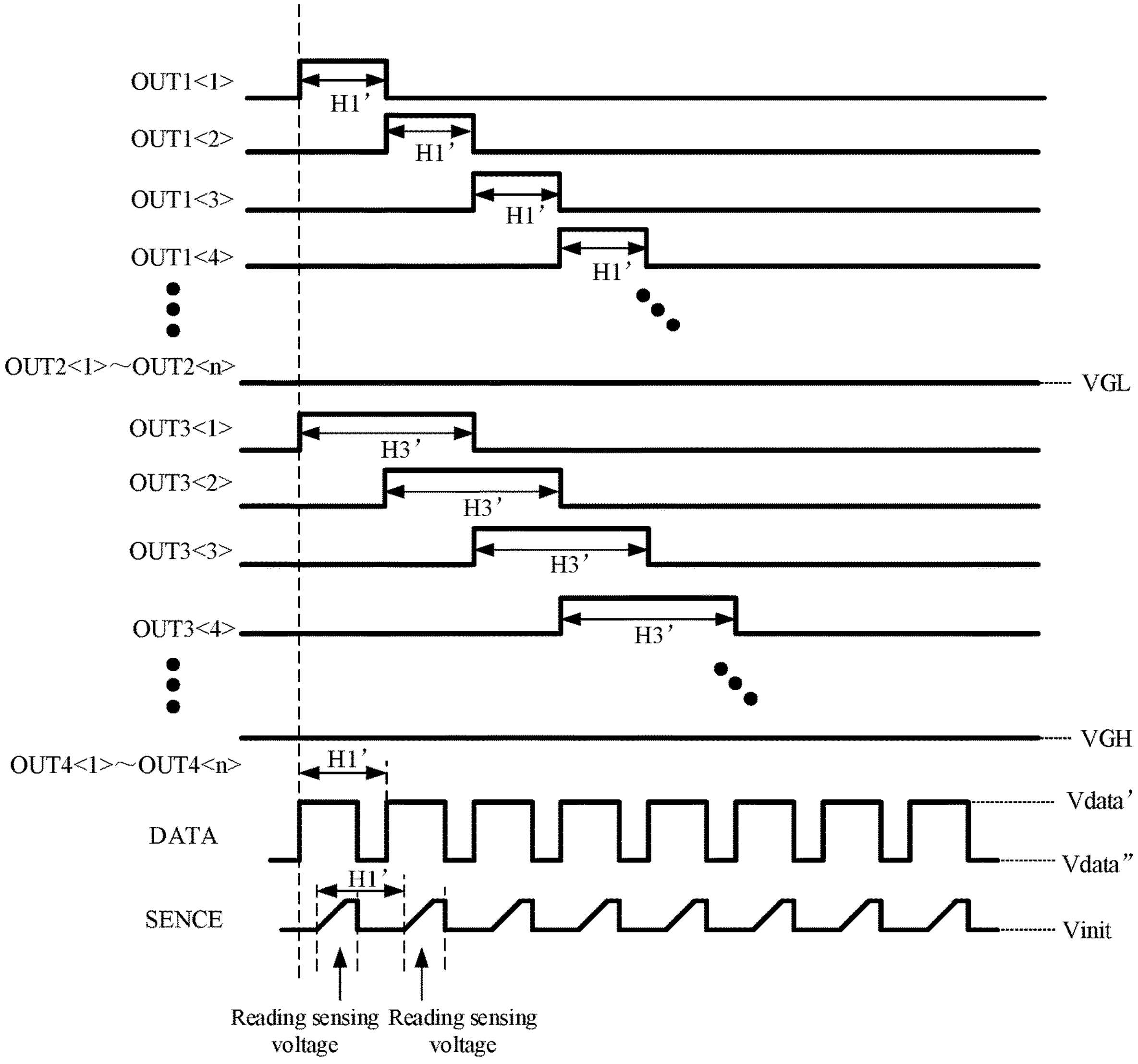
FIG. 8A is a timing diagram illustrating an operation of the display apparatus shown in FIG. 7 in a sensing mode.
Figure 8B:
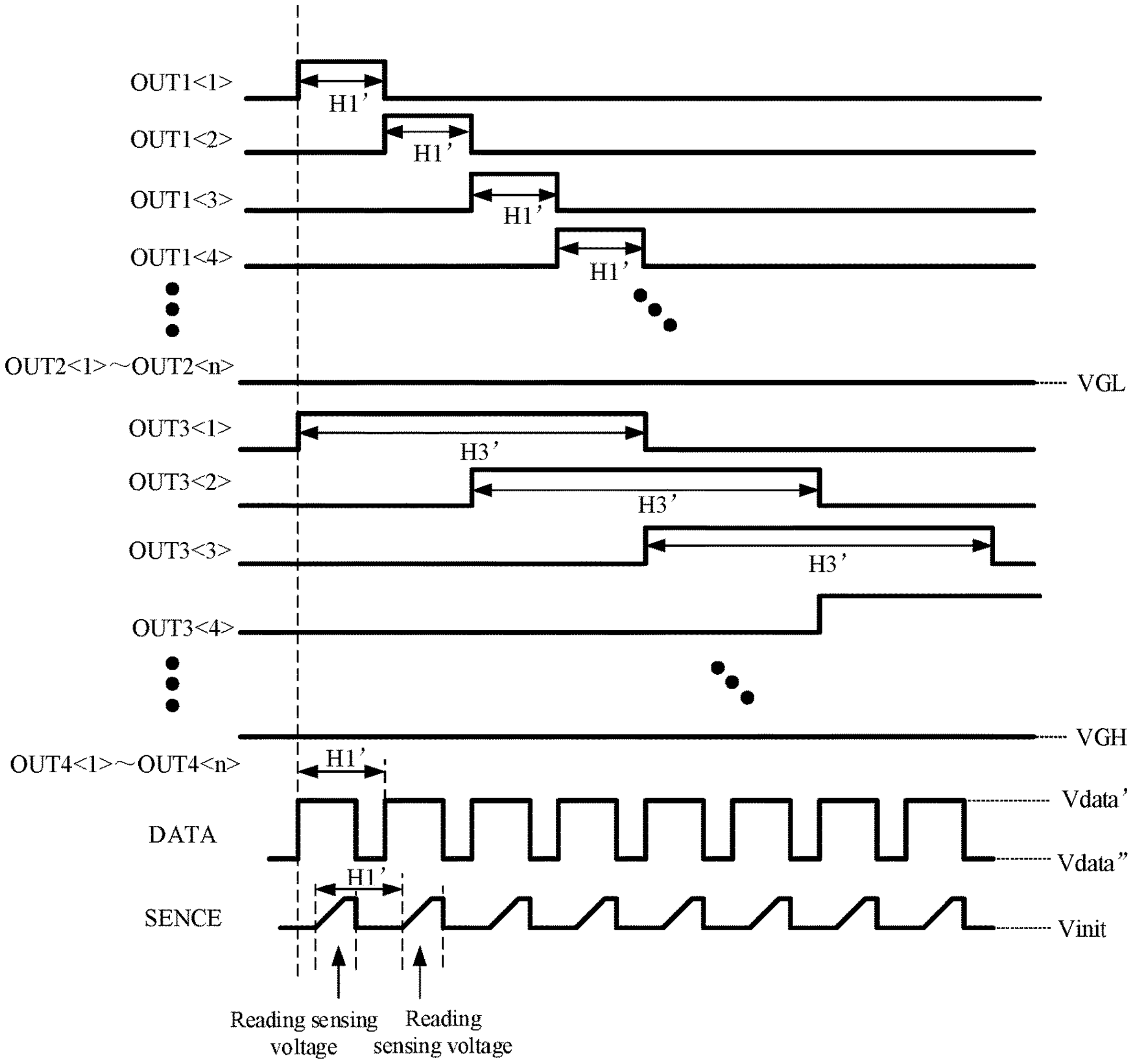
FIG. 8B is a timing diagram illustrating an operation of the display apparatus shown in FIG. 7 in a sensing mode.
Figure 9A:
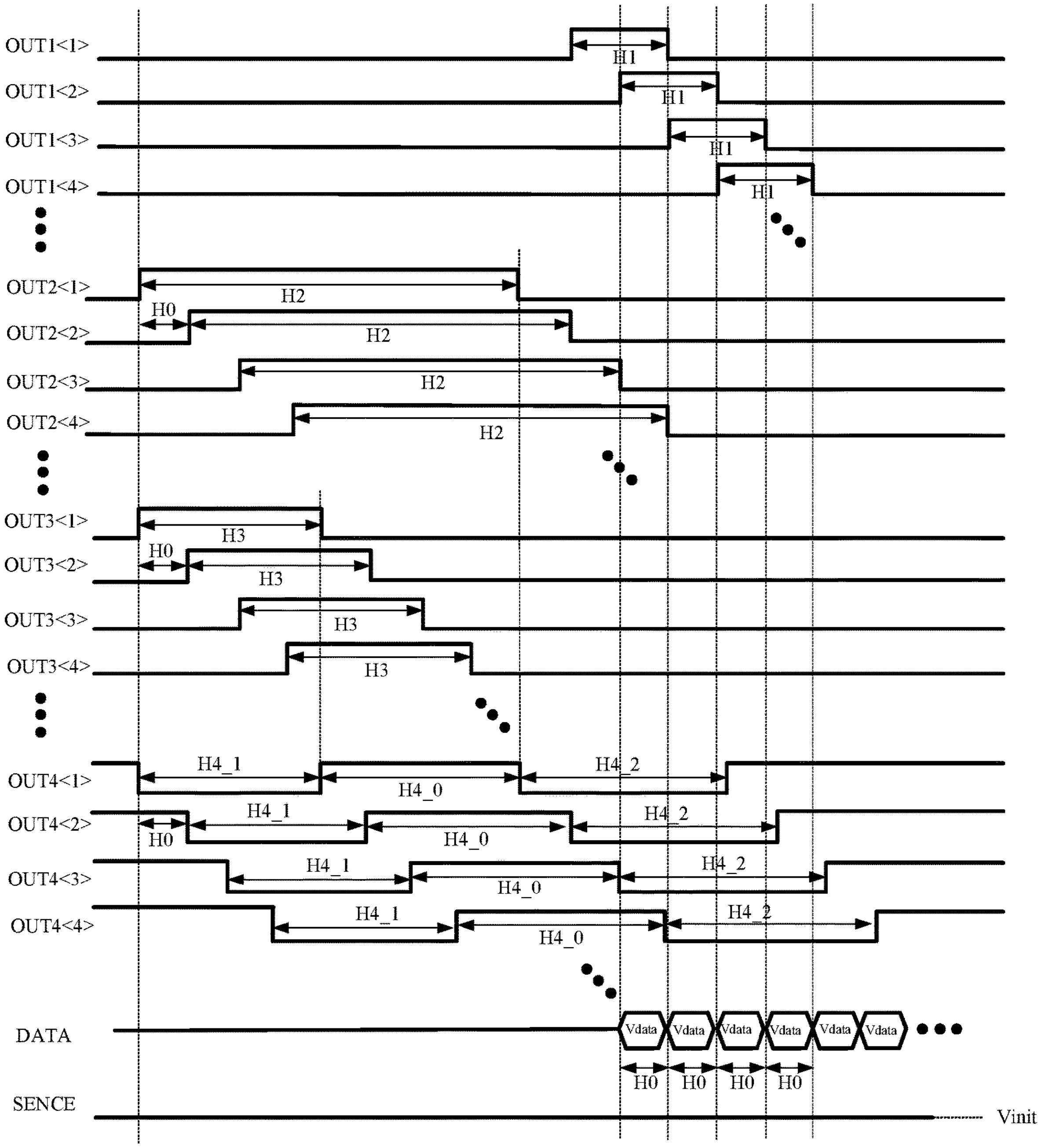
FIG. 9A is a timing diagram illustrating an operation of the display apparatus shown in FIG. 7 in a display mode.
Figure 9B:
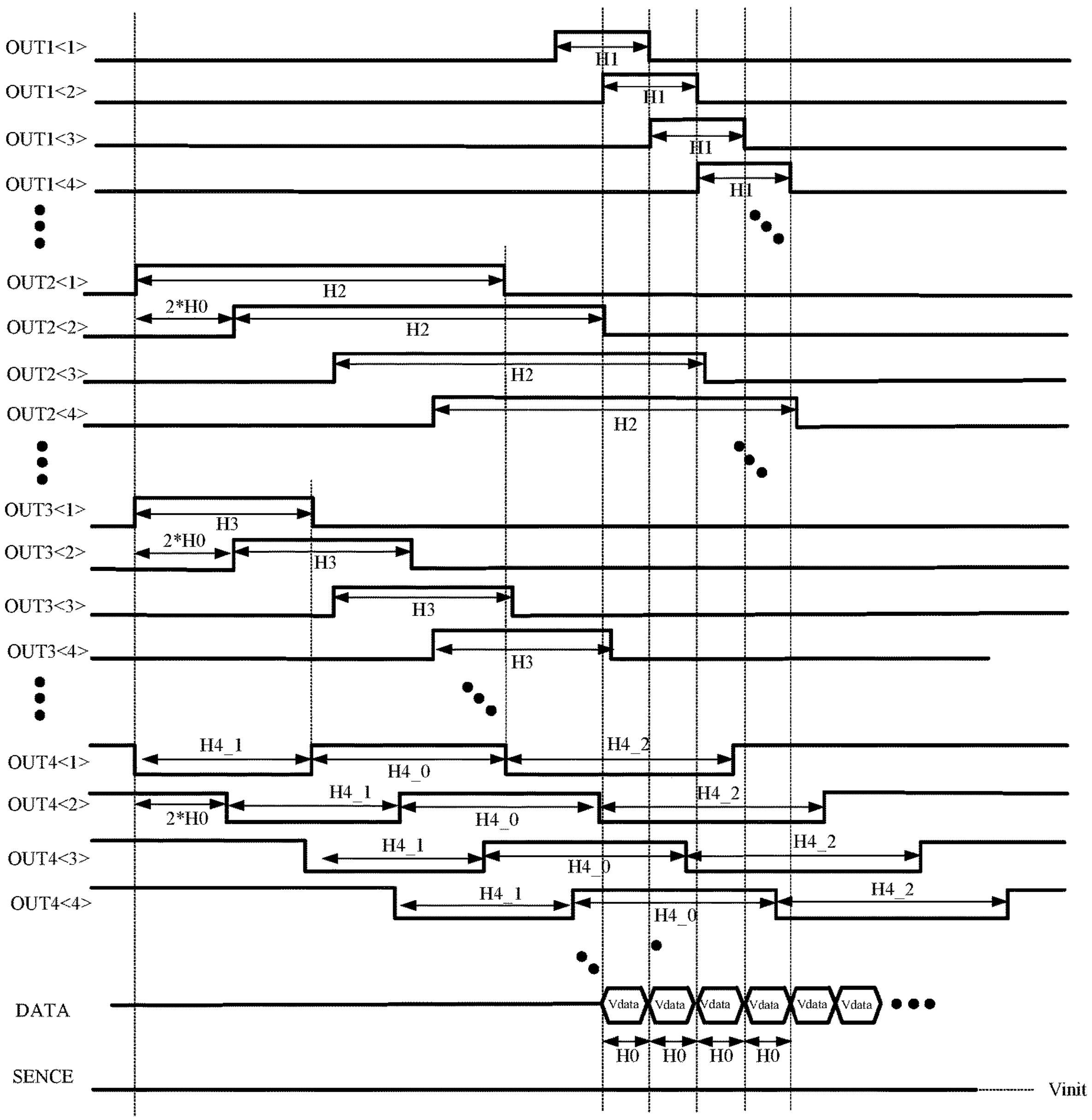
FIG. 9B is a timing diagram illustrating an operation of the display apparatus shown in FIG. 7 in a display mode.

Based on the same inventive concept, the embodiments of the present disclosure further provide a display apparatus. FIG. 7 is a schematic diagram of a structure of a display apparatus according to embodiments of the present disclosure; FIG. 8A is a timing diagram illustrating an operation of the display apparatus shown in FIG. 7 in a sensing mode; FIG. 8B is a timing diagram illustrating an operation of the display apparatus shown in FIG. 7 in a sensing mode; FIG. 9A is a timing diagram illustrating an operation of the display apparatus shown in FIG. 7 in a display mode; FIG. 9B is a timing diagram illustrating an operation of the display apparatus shown in FIG. 7 in a display mode. As shown in FIGS. 7 to 9B, the display apparatus includes: a display panel DP, including: a pixel arrangement region A and a peripheral region B at a periphery of the pixel arrangement region A; a plurality of pixel units PIX are provided in the pixel arrangement region A, and each pixel unit PIX includes: a pixel driving circuit and a light emitting element. The pixel driving circuit adopts the pixel driving circuit provided by the foregoing embodiments. For the specific description of the pixel driving circuit, reference may be made to the contents of the foregoing embodiments, and details are not repeated here.

The pixel arrangement region A includes at least an active region (also referred to as an AA region), and pixels in the AA region are used for displaying pictures. In some embodiments, the pixel arrangement region A further includes a dummy pixel region; the dummy pixel region is located between the AA region and the peripheral region B, the dummy pixel region is generally covered by a black matrix, and pixels in the dummy pixel region are not used for displaying pictures.

In some embodiments, all the pixel units PIX located in the pixel arrangement region A are divided into a plurality of pixel unit PIX groups sequentially arranged along a second direction Y, each pixel unit PIX group includes pixel units PIX sequentially arranged along a first direction X, and the first direction X intersects with the second direction Y.

Each pixel unit PIX group is configured with one corresponding first control signal line G1 and one corresponding third control signal line G3; the first control signal line G1 and the third control signal line G3 both extend along the first direction X; and the pixel units PIX located in the same pixel unit PIX group are connected to the same first control signal line G1 and the same third control signal line G3.

Each pixel unit PIX in the pixel unit PIX group corresponds to one corresponding data line DATA and one corresponding sensing line SENCE; the data line DATA and the sensing line SENCE extend along the second direction Y; and the pixel units PIX located in different pixel unit PIX groups and arranged along the second direction Y are connected to the same data line DATA and the same sensing line SENCE.

In some embodiments, the number of pixel unit PIX groups is i×n, where i and n are positive integers; the display panel DP further includes: a first gate driving circuit DC1 and a third gate driving circuit DC3.

The first gate driving circuit DC1 is located in the peripheral region B; and the first gate driving circuit DC1 and the pixel arrangement region A are arranged along the first direction X; the first gate driving circuit DC1 is configured with i×n first signal output terminals OUT1 in one-to-one correspondence with the first control signal lines G1, and connected to the corresponding first control signal lines G1.

The third gate driving circuit DC3 is located in the peripheral region B; and the third gate driving circuit DC3 and the pixel arrangement region A are arranged along the first direction X; the third gate driving circuit DC3 is configured with n third signal output terminals OUT3; each third signal output terminal OUT3 corresponds to i different third control signal lines G3, and is connected to the i corresponding third control signal lines G3.

In the embodiments of the present disclosure, each first signal output terminal OUT1 is connected to one corresponding first control signal lines G1, and each third signal output terminal OUT3 is connected to the i corresponding third control signal lines G3. That is, in the present disclosure, each first signal output terminal OUT1 may provide signals to only one corresponding pixel unit PIX group, and each third signal output terminal OUT3 may provide signals to one (i is 1) or more (i is an integer greater than or equal to 2) pixel unit PIX groups.

It should be noted that FIG. 8A illustrates an operation timing with i of 1, and FIG. 8B illustrates an operation timing with i of 2.

Referring to FIGS. 8A and 8B, an operation mode of the display apparatus includes a sensing mode. In the sensing mode, the first signal output terminals OUT1<1> to OUT1<i×n> of the first gate driving circuit DC1 sequentially output first control signal pulses in the active level state and each with a pulse width H1', and the third signal output terminals OUT3<1> to OUT3<n> of the third gate driving circuit DC3 sequentially output third control signal pulses in the active level state and each with a pulse width H3'; H3'≥i×H1'; a time interval between starting times of outputting the first control signal pulses from any two adjacent of the first signal output terminals OUT1<1> to OUT1<i×n> is H1'; a time interval between starting times of outputting the third control signal pulses from any two adjacent of the third signal output terminals OUT3<1> to OUT3<n> is i×H1', and a starting time of outputting the first control signal pulse from the $1^{st}$ first signal output terminal OUT1<1> in the first gate driving circuit DC1 is the same as that of outputting the third control signal pulse from the $1^{st}$ third signal output terminal OUT3<1> in the third gate driving circuit DC3.

In some embodiments, the display apparatus further includes: a source driving chip and a sensing chip. The source driving chip is provided with a plurality of data voltage output terminals in one-to-one correspondence with the data lines DATA, and connected to the corresponding data lines DATA; the sensing chip is connected to each sensing line SENCE.

The source driving chip and the sensing chip are electrically connected to conductive connection terminals located in a bonding region Q in the peripheral region BB through a Chip On Flex (COF) process; the data lines DATA and the sensing lines SENCE extend to the bonding region Q and are electrically connected to the corresponding conductive connection terminals (not shown) in the bonding region Q, so that the source driving chip may provide data voltages to the corresponding data lines DATA through the data voltage output terminals, and the sensing chip may transmit signals with the sensing lines SENCE. In some embodiments, the source driving chip and the sensing chip may be integrated into the same chip.

With continued reference to FIGS. 8A and 8B, in the sensing mode, each data voltage output terminal of the source driving chip alternately outputs the sensing data voltage and the reset data voltage, and the sensing chip alternately outputs the initialization voltage to each sensing line SENCE and reads the sensing voltage through the sensing line SENCE; the total time length of outputting the sensing data voltage and the reset data voltage by the data voltage output terminal at one time is H1'; a starting time of outputting the reset data voltage by the data voltage output terminal for the first time is the same as that of outputting the first control signal pulse by the $1^{st}$ first signal output terminal OUT1<1> in the first gate driving circuit DC1; a starting time of reading the sensing voltage by the sensing chip through the sensing line SENCE for the first time is after the starting time of outputting the reset data voltage by the data voltage output terminal for the first time, and an ending time of reading the sensing voltage by the sensing chip through the sensing line SENCE for the first time is not later than that of outputting the reset data voltage by the data voltage output terminal for the first time, and a read period of reading the sensing voltage by the sensing chip through the sensing line SENCE is H1'.

In some embodiments, the threshold compensation circuit and the light emitting control circuit are disposed in the pixel driving circuit (for a specific circuit structure, see the contents of the foregoing embodiments), and the display panel DP further includes: a second gate driving circuit DC2 and a light emitting control gate driving circuit DC4.

The second gate driving circuit DC2 is located in the peripheral region B; and the second gate driving circuit DC2 and the pixel arrangement region A are arranged along the first direction X; the second gate driving circuit DC2 is configured with n second signal output terminals OUT2; each second signal output terminal OUT2 corresponds to i different second control signal lines G2, and is connected to i corresponding second control signal lines G2.

The light emitting control gate driving circuit DC4 is located in the peripheral region B; and the light emitting control gate driving circuit DC4 and the pixel arrangement region A are arranged along the first direction X; the light emitting control gate driving circuit DC4 is configured with n light emitting control signal output terminals OUT4; each light emitting control signal output terminal OUT4 corresponds to i different light emitting control signal lines EM and is connected to the i corresponding light emitting control signal lines EM;

In the embodiments of the present disclosure, each second signal output terminal OUT2 may provide signals to one (i is 1) or more (i is an integer greater than or equal to 2) of pixel unit PIX groups, and each light emitting control signal output terminal OUT4 may provide signals to one (i is 1) or more (i is an integer greater than or equal to 2) of pixel unit PIX groups.

It should be noted that FIG. 9A illustrates an operation timing with i of 1, and FIG. 9B illustrates an operation timing with i of 2.

Referring to FIGS. 9A and 9B, the operation mode of the display apparatus includes a display mode; in the display mode, the second signal output terminals OUT2<1> to OUT2<n> of the second gate driving circuit DC2 sequentially output second control signal pulses in the active level state and each with a pulse width H2; the third signal output terminals OUT3<1> to OUT3<n> of the third gate driving circuit DC3 sequentially output third control signal pulses in the active level state and each with a pulse width H3; the light emitting control signal output terminals OUT4<1> to OUT4<n> of the light emitting control gate driving circuit DC4 sequentially output first light emitting control signal pulses in the inactive level state and each with a pulse width H4_1 and second light emitting control signal pulses in the inactive level state and each with a pulse width H4_2; the first signal output terminals OUT1<1> to OUT1<i×n> of the first gate driving circuit DC1 sequentially output the first control signal pulses in the active level state and each with a pulse width H1; the data voltage output terminals of the source driving chip sequentially output the display data voltages required by the corresponding pixel units PIX, and the sensing chip outputs the initialization voltages to the sensing lines SENSE; a starting time of outputting the second control signal pulse from a $1^{st}$ second signal output terminal OUT2<1> in the second gate driving circuit DC2, a starting time of outputting the third control signal pulse from a $1^{st}$ third signal output terminal OUT3<1> in the third gate driving circuit DC3, and a starting time of outputting the first light emitting control signal from a $1^{st}$ light emitting control signal output terminal OUT4<1> in the light emitting control gate driving circuit DC4 are the same; and a starting time of outputting the first control signal pulse from the $1^{st}$ first signal output terminal OUT1<1> in the first gate driving circuit DC1 is after an ending time of outputting the second control signal pulse from the $1^{st}$ second signal output terminal OUT2<1> in the second gate driving circuit DC2; a time length of outputting the display data voltage from the data voltage output terminal of the source driving chip at one time is H0; the time interval between the starting times of outputting the first control signal pulses from any two adjacent of the first signal output terminals OUT1<1> to OUT1<i×n> is H0; a time interval between starting times of outputting the second control signal pulses from any two adjacent of the second signal output terminals OUT2<1> to OUT2<n>, the time interval between the starting times of outputting the third control signal pulses from any two adjacent of the third signal output terminals OUT3<1> to OUT3<n>, and a time interval between starting times of outputting the first light emitting control signal pulses from any two adjacent of the light emitting control signal output terminals OUT4<1> to OUT4<n> are i×H0; a time length from an ending time of the first light emitting control signal pulse to a starting time of the second light emitting control signal pulse is H4_0; H0, H2, H3, H4_0, H4_1, H4_2 and H1 satisfy: H1≥H0, H4_1=H3, H4_0+H4_1=H2 and H4_2≥H1+(i−1)×H0.

In order to ensure that the data voltage Vdata may be completely written to the corresponding pixel unit, the time length (i.e., H1) for writing the data voltage to the pixel unit at one time should be greater than or equal to the time length (i.e., H0) for providing the display data voltage from the data voltage output terminal to the pixel unit, that is, H1≥H0.

In order to ensure that the fourth transistor T4 is turned off and the third transistor is turned on when each pixel unit enters the corresponding reset stage p1, and the fourth transistor T4 is turned on and the third transistor is turned off after the reset stage p1 is ended, the pulse width H4_1 of the first light emitting control signal pulse output by each of the light emitting control signal output terminals OUT4<1> to OUT4<n> and corresponding to the reset stage p1 is necessarily equal to the pulse width H3 of the third control signal pulse output by each of the third signal output terminals OUT3<1> to OUT3<n>, i.e., H4_1=H3.

Referring again to FIG. 4, each second control signal pulse (with the pulse width H2) corresponds to one reset stage p1 and one compensation stage p2, and each first light emitting control signal pulse (with the pulse width H4_1) corresponds to one reset stage p1, and a time length (with a time length H4_0) from an ending time of outputting the first light emitting control signal pulse by the light emitting control signal output terminal to a starting time of outputting the second light emitting control signal pulse by the light emitting control signal output terminal corresponds to one compensation stage p2, i.e., H4_0+H4_1=H2.

In the embodiments of the present disclosure, each second light emitting control signal pulse (with the pulse width H4_2) corresponds to a period from the end of the reset stage p2 to the start of the light emitting stage p4, during which at least one data writing stage p3 is included. If it is necessary to write data to only one row of pixel units in the period, H4_2 should satisfy H4_2≥H1. However, each light emitting control signal output terminal may correspond to two or even more light emitting control signal lines, so that multiple data writing operations are required in the above period. A time length of a first data writing stage is H1, and then, every time a data writing process is added, the time length should be correspondingly increased by at least H0 (the shortest time length required for completing one-time data writing process); therefore, H4_2 should satisfy: H4_2≥H1+(i−1)×H0.

Referring again to FIGS. 8A and 8B, in some embodiments, in the sensing mode, the second signal output terminals OUT2<1> to OUT2<n> of the second gate driving circuit DC2 continuously output inactive level signals, and the light emitting control signal output terminals OUT4<1> to OUT4<n> of the light emitting control gate driving circuit DC4 continuously output active level signals.

It should be noted that FIG. 7 only exemplarily shows that the gate driving circuits DC1 to DC4 are located on one side of the display region A, which is merely an exemplary case. In practical applications, the gate driving circuits DC1 to DC4 may be selectively distributed on two opposite sides of the display region A in the first direction, or the gate driving circuits DC1 to DC4 are disposed on two opposite sides of the display region A in the first direction (in this case, the gate driving circuits may perform double-side driving on the corresponding control signal lines), which all fall within the scope of the present disclosure.

Figure 10A:
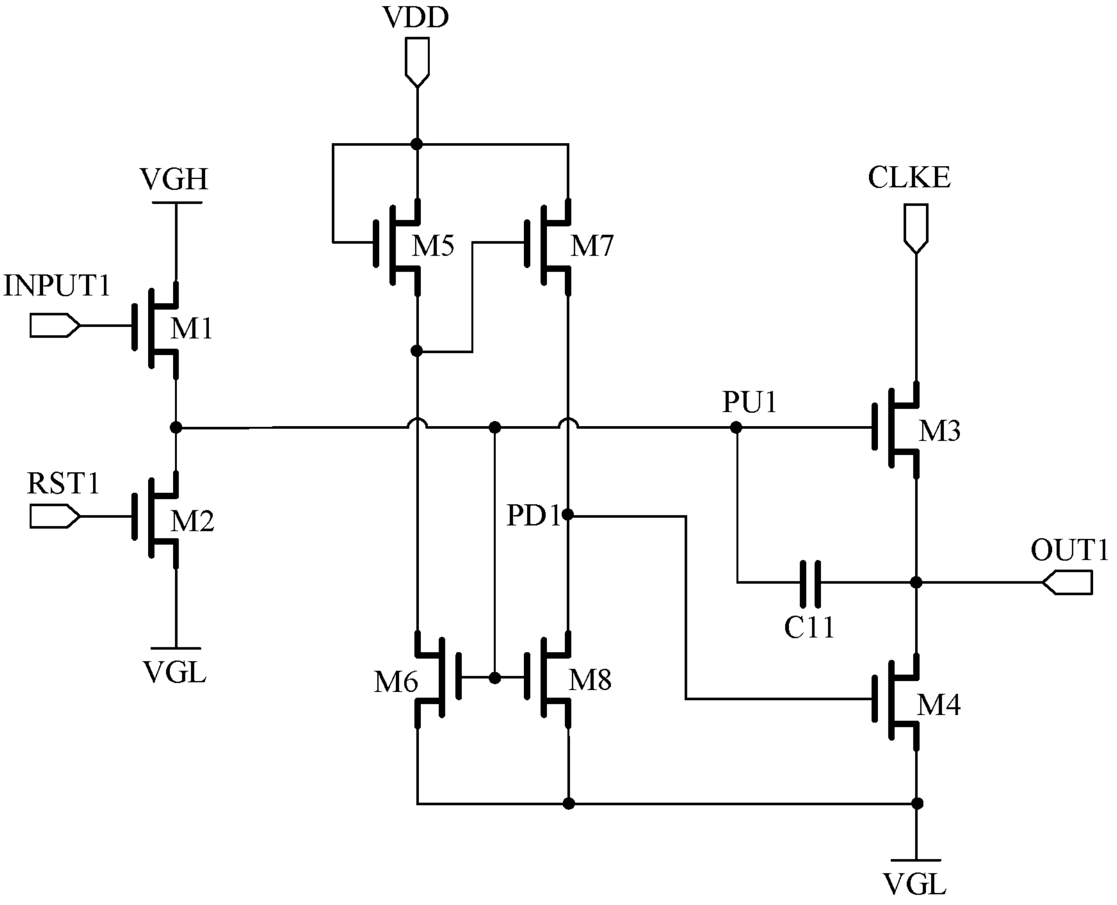
FIG. 10A is a schematic diagram of a circuit structure of a first shift register according to embodiments of the present disclosure.
Figure 10B:
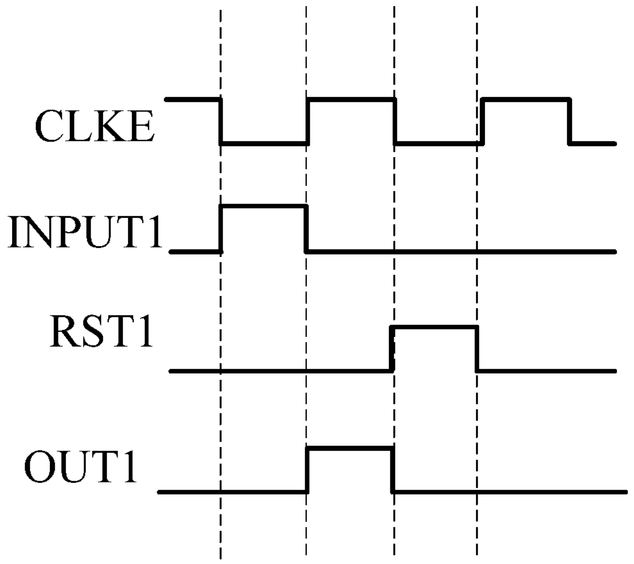
FIG. 10B is a timing diagram illustrating an operation of the first shift register shown in FIG. 10A.

In the embodiments of the present disclosure, the first gate driving circuit DC1 includes cascaded i×n first shift registers, each having one first signal output terminal OUT1. FIG. 10A is a schematic diagram of a circuit structure of a first shift register according to embodiments of the present disclosure; FIG. 10B is a timing diagram illustrating an operation of the first shift register shown in FIG. 10A. As shown in FIGS. 10A and 10B, as an alternative, each first shift register may adopt an 8T1C circuit shown in FIG. 10A, that is, includes eight transistors M1 to M8 and one capacitor C11. The first shift register shown in FIG. 10A may adopt the operation timing shown in FIG. 10B, and the specific operation process is not described herein again.

It should be noted that the pulse width of the first control signal pulse in the active level state output from the first signal output terminal OUT1 may be adjusted by adjusting a period of a clock signal provided by a clock signal terminal CLKE and the time of the clock signal in the active level state in one period.

Figure 11A:
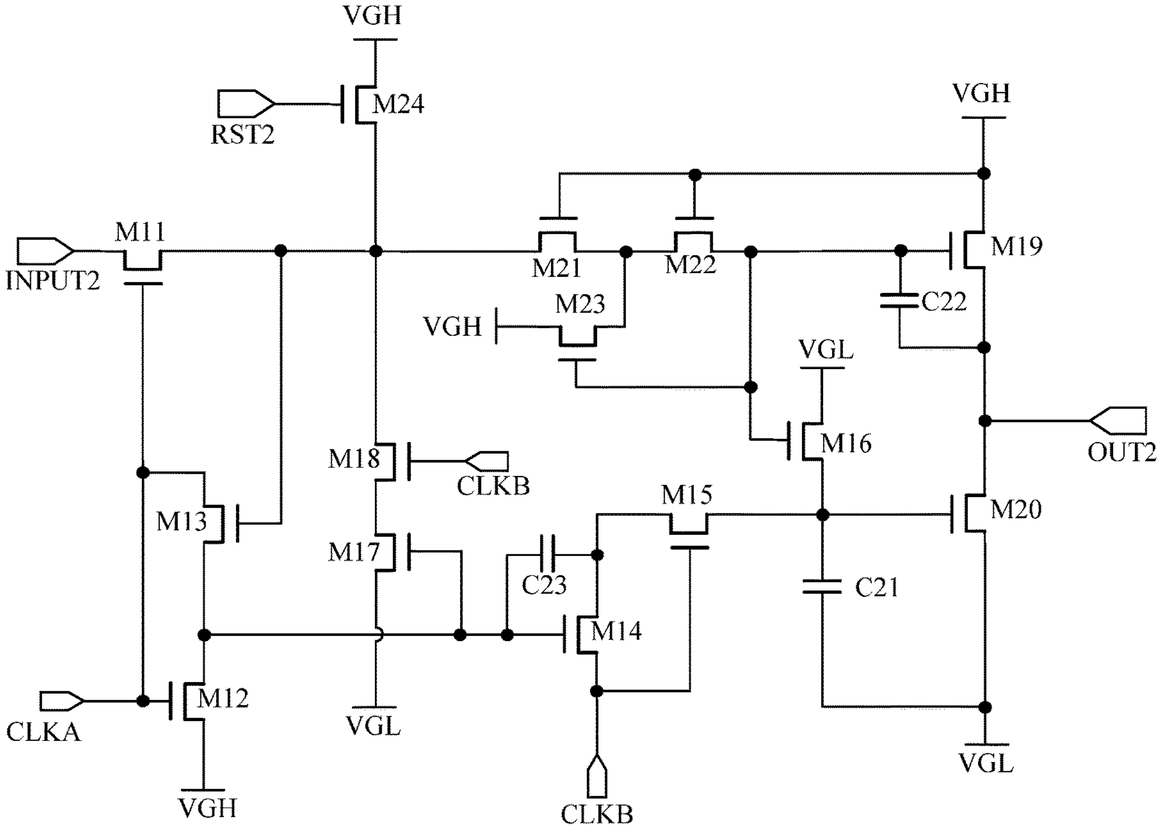
FIG. 11A is a schematic diagram of a circuit structure of a fourth shift register according to embodiments of the present disclosure.
Figure 11B:
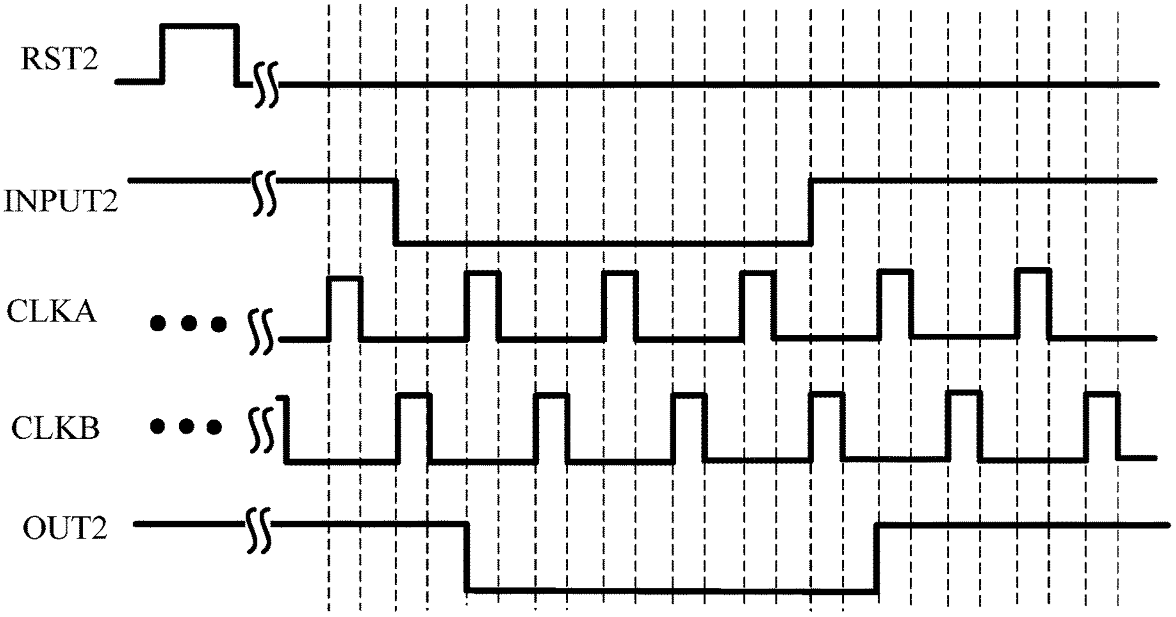
FIG. 11B is a timing diagram illustrating an operation of the fourth shift register shown in FIG. 11A.

In the embodiments of the present disclosure, the light emitting control gate driving circuit DC4 includes cascaded n fourth shift registers, each having one light emitting control signal output terminal OUT4. FIG. 11A is a schematic diagram of a circuit structure of a fourth shift register according to embodiments of the present disclosure; FIG. 11B is a timing diagram illustrating an operation of the fourth shift register shown in FIG. 11A. As shown in FIG. 11A and FIG. 11B, as an alternative, each fourth shift register may adopt a 14T3C circuit shown in FIG. 11A, that is, includes fourteen transistors M11 to M24 and three capacitors C21 to C23. The fourth shift register shown in FIG. 11A may adopt the operation timing shown in FIG. 11B, and the specific operation process is not described herein again.

It should be noted that the pulse width of the light emitting control signal pulse in the inactive level state output from the light emitting control signal output terminal OUT4 may be adjusted by adjusting a pulse width of an input signal pulse in the inactive level state provided from a signal input terminal INPUT2, a period of a clock signal provided from clock signal terminals CLKA and CLKB, and the time of the clock signal in the active level state in one period.

Figure 12A:
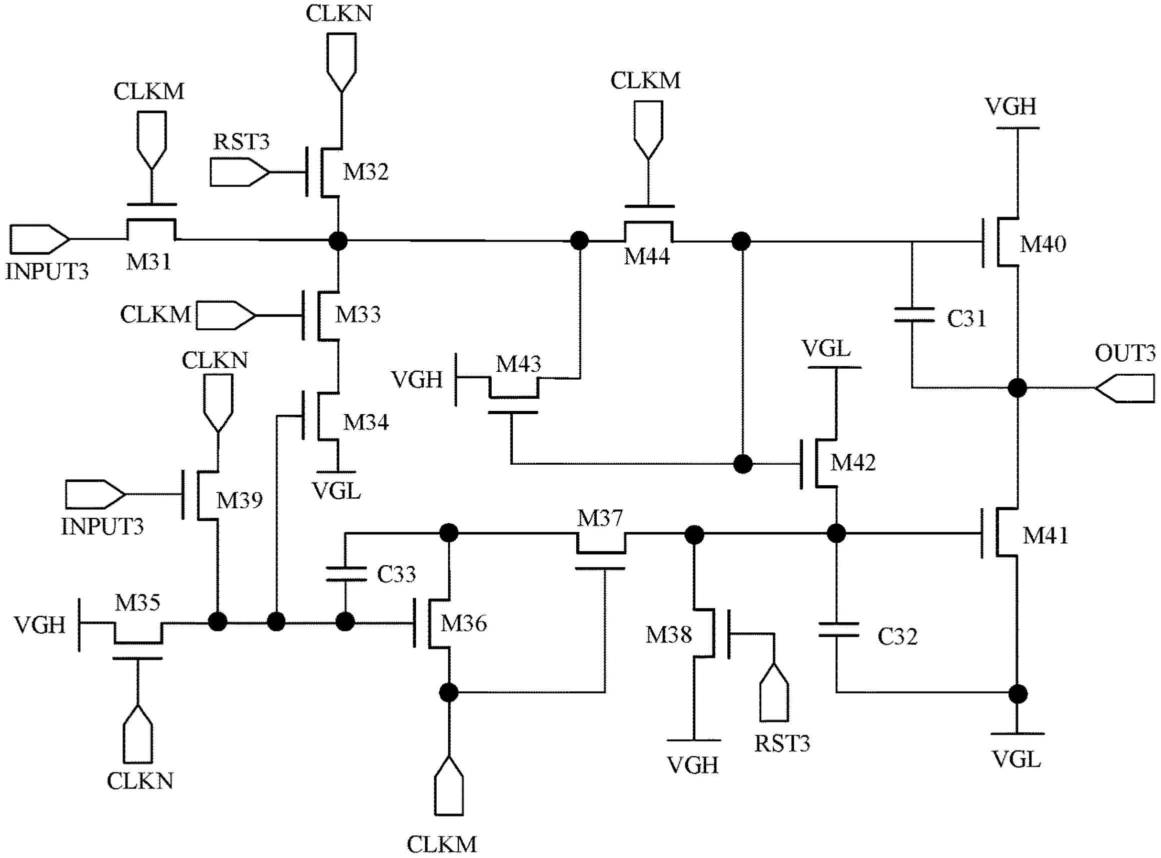
FIG. 12A is a schematic diagram of a circuit structure of a third shift register according to embodiments of the present disclosure.
Figure 12B:
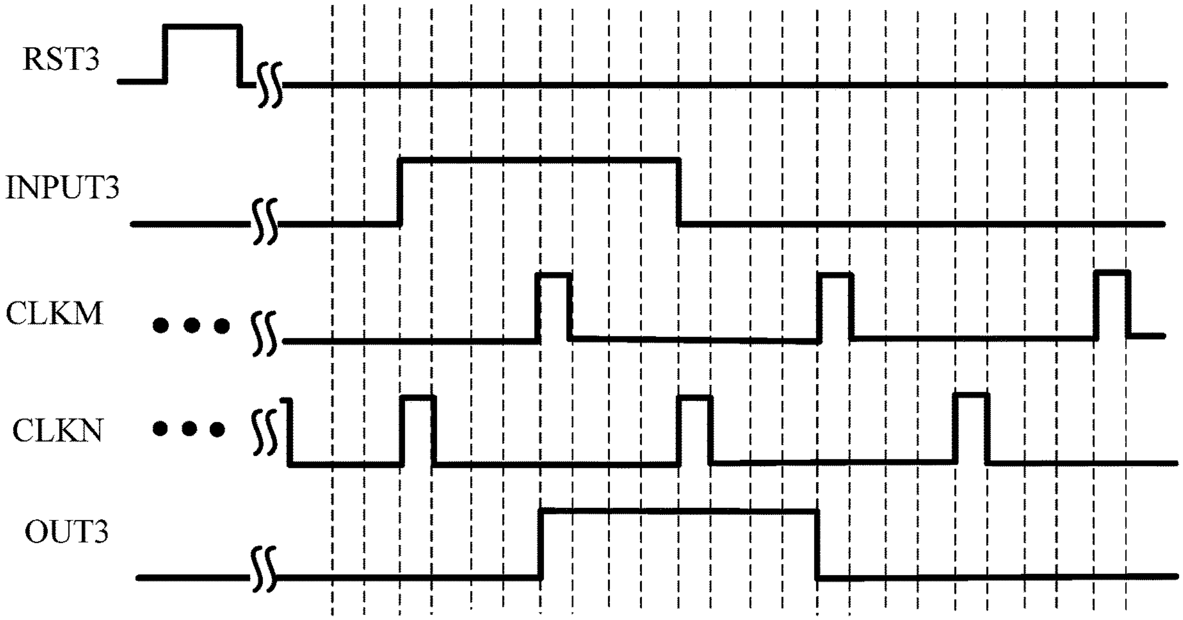
FIG. 12B is a timing diagram illustrating an operation of the third shift register shown in FIG. 12A.
Figure 12C:
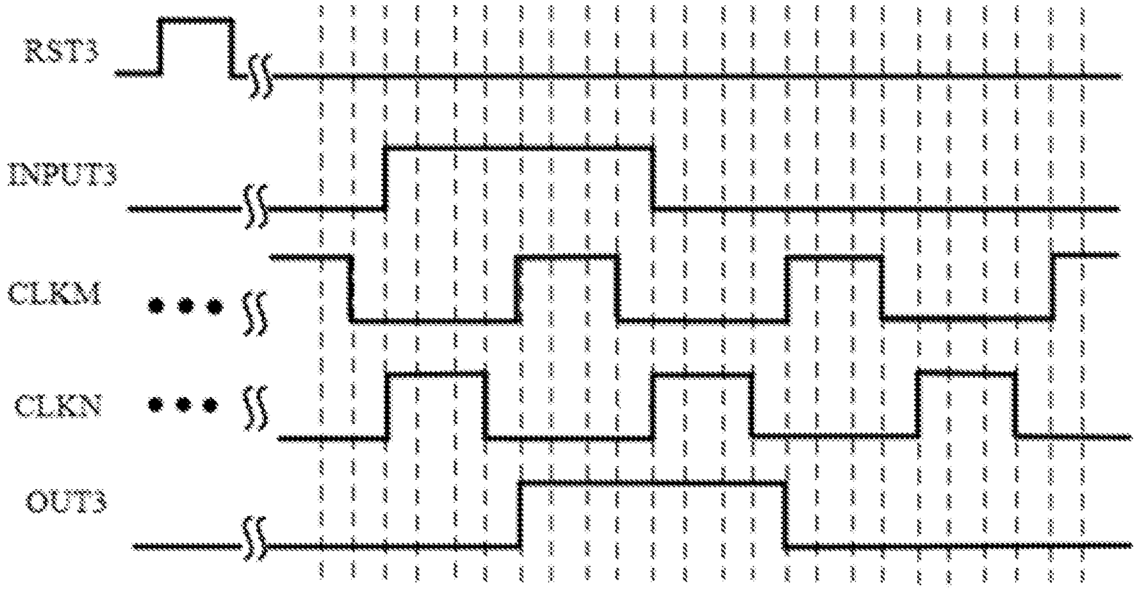
FIG. 12C is a timing diagram illustrating an operation of the third shift register shown in FIG. 12A.

In the embodiments of the present disclosure, the third gate driving circuit DC3 includes cascaded n third shift registers, each having one third signal output terminal OUT3. FIG. 12A is a schematic diagram of a circuit structure of a third shift register according to the embodiments of the present disclosure; FIG. 12B is a timing diagram illustrating an operation of the third shift register shown in FIG. 12A; and FIG. 12C is another timing diagram illustrating an operation of the third shift register shown in FIG. 12A. As shown in FIGS. 12A to 12C, as an alternative, each third shift register may adopt a 14T3C circuit shown in FIG. 12A, that is, includes fourteen transistors M31 to M44 and three capacitors C31 to C33; the third shift register shown in FIG. 12A may adopt the operation timing shown in FIG. 12B or FIG. 12C, and the specific operation process is not described herein again.

It should be noted that the pulse width of the third control signal pulse in the active level state output from the third signal output terminal OUT3 may be adjusted by adjusting a pulse width of an input signal pulse in the active level state provided from a signal input terminal INPUT3, a period of a clock signal provided from clock signal terminals CLKM and CLKN, and the time of the clock signal in the active level state in one period.

In the embodiments of the present disclosure, the second gate driving circuit DC2 includes cascaded n second shift registers, each having one second signal output terminal OUT2; each second shift register in the embodiments of the present disclosure may adopt the same circuit structure as the third shift register shown in FIG. 12A. Alternatively, the second shift register may have other circuit structure.

It should be noted that the specific circuit structures of the first to fourth shift registers illustrated above are only one optional implementation in the present disclosure, and do not limit the technical solution of the present disclosure. In the present disclosure, the specific circuit structures of the first to fourth shift registers are not limited in the present disclosure.

In addition, the first gate driving circuit, the second gate driving circuit, the third gate driving circuit, and the light emitting control gate driving circuit in the embodiments of the present disclosure may be directly formed in the peripheral region of the display panel based on a GOA (gate-on-array) process.

The display apparatus provided by the embodiments of the present disclosure may be: any product or component with a display function, such as a flexible wearable device, a mobile phone, a tablet computer, a television, a display, a notebook computer, a digital photo frame, a navigator or the like. Other essential components of the display apparatus are understood by one of ordinary skill in the art, and are not described herein or should not be construed as limiting the invention.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A pixel driving circuit, comprising: a driving transistor, a data writing circuit, a threshold compensation circuit, a sensing circuit and a light emitting element, wherein a gate electrode of the driving transistor, the data writing circuit, and the threshold compensation circuit are connected to a first node; a second electrode of the driving transistor, the sensing circuit, the threshold compensation circuit, and the light emitting element are connected to a second node; and a first electrode of the driving transistor is connected to a first power terminal;

the data writing circuit is connected to a first control signal line and a data line, and is configured to write a display data voltage from the data line to the first node in response to control of an active level signal from the first control signal line in a display driving process, and to sequentially write a sensing data voltage and a reset data voltage from the data line to the first node in response to control of an active level signal from the first control signal line in a threshold voltage sensing process;

the threshold compensation circuit is connected to a reference voltage supply terminal and a second control signal line, and is configured to write a reference voltage from the reference voltage supply terminal to the first node and write a first compensation voltage to the second node in response to control of an active level signal from the second control signal line in the display driving process, and write a second compensation voltage to the second node in response to a voltage at the first node changing from the reference voltage to the display data voltage;

the sensing circuit is connected to a third control signal line and a sensing line, and is configured to write an initialization voltage from the sensing line to the second node and write a sensing voltage at the second node to the sensing line in response to control of an active level signal from the third control signal line in the threshold voltage sensing process; and the driving transistor is configured to output a corresponding current to the second node according to a voltage difference between the first node and the second node;

wherein the threshold compensation circuit comprises: a second transistor, a first capacitor and a second capacitor;

a control electrode of the second transistor is connected to the second control signal line, a first electrode of the second transistor is connected to the reference voltage supply terminal, and a second electrode of the second transistor is connected to the first node;

a first terminal of the first capacitor is connected to the first node, and a second terminal of the first capacitor is connected to the second node; and a first terminal of the second capacitor is connected to the second node, and a second terminal of the second capacitor is connected to a second power terminal;

the sensing circuit comprises a third transistor;

a control electrode of the third transistor is connected to the third control signal line, a first electrode of the third transistor is connected to the second node, and a second electrode of the third transistor is connected to the sensing line;

the sensing line is connected to an external sensing chip through a first switch, and is connected to an initialization voltage supply terminal through a second switch such that when the first switch and the second switch are both in an open state, the sensing line is in a floating state; when the first switch is in the open state and the second switch is in a closed state, the initialization voltage is loaded in the sensing line;

when the first switch is in the closed state and the second switch is in the open state, the sensing line is connected to the external sensing chip, so that the external sensing chip reads a voltage loaded in the sensing line; and wherein the first electrode is one of a drain electrode and a source electrode, and the second electrode is the other of the drain electrode and the source electrode.

2. The pixel driving circuit according to claim 1, wherein the first compensation voltage is V1, the second compensation voltage is V2;

$$V1 = Vref - Vth;$$

$$V2 = V1 + (Vdata - Vref) \times \alpha$$

Vref is the reference voltage, Vth is a threshold voltage of the driving transistor, Vdata is the display data voltage, and $\alpha$ is a constant and $0<\alpha<1$; and $\alpha = c1/(c1+c2)$, c1 is a capacitance of the first capacitor, and c2 is a capacitance of the second capacitor.

3. The pixel driving circuit according to claim 1, wherein the sensing voltage is equal to a difference between the sensing data voltage and a threshold voltage of the driving transistor.

4. The pixel driving circuit according to claim 1, wherein the threshold voltage sensing process comprises: a sensing initialization stage, a sensing execution stage and a sensing reset stage;

the display driving process comprises: a pixel reset stage, a compensation stage, a data writing stage and a light emitting stage;

the data writing circuit is configured to write the sensing data voltage from the data line to the first node in response to control of an active level signal from the first control signal line in the sensing initialization stage and the sensing stage, to write the reset data voltage from the data line to the first node in response to control of an active level signal from the first control signal line in the sensing reset stage, and to write the display data voltage from the data line to the first node in response to control of an active level signal from the first control signal line in the data writing stage;

the threshold compensation circuit is configured to write the reference voltage from the reference voltage supply terminal to the first node in response to control of an active level signal from the second control signal line in the pixel reset stage and the compensation stage, and to write the first compensation voltage to the second node in the compensation stage, and to write the second compensation voltage to the second node in response to the voltage at the first node changing from the reference voltage to the display data voltage in the data writing stage; and the sensing circuit is configured to write the initialization voltage from the sensing line to the second node in response to control of an active level signal from the third control signal line in the sensing initialization stage, and to write the sensing voltage at the second node to the sensing line in response to control of an active level signal from the third control signal line in the sensing stage.

5. The pixel driving circuit according to claim 4, wherein the sensing circuit is further configured to write the initialization voltage from the sensing line to the second node in response to control of an active level signal from the third control signal line in the sensing reset stage; and wherein the sensing circuit is further configured to write the initialization voltage from the sensing line to the second node in response to control of an active level signal from the third control signal line in the pixel reset stage.

6. The pixel driving circuit according to claim 4, further comprising: a light emitting control circuit; wherein the first electrode of the driving transistor is connected to the first power terminal through the light emitting control circuit; and the light emitting control circuit is connected to a light emitting control line, and is configured to write a first operating voltage from the first power terminal to the first electrode of the driving transistor in response to control of an active level signal from the light emitting control line in the compensation stage and the light emitting stage, and to control the first electrode of the driving transistor to be disconnected from the first power terminal in response to control of an inactive level signal from the light emitting control line in the pixel reset stage and the data writing stage; and wherein the light emitting control circuit is further configured to write the first operating voltage from the first power terminal to the first electrode of the driving transistor in response to control of an active level signal from the light emitting control line in the sensing initialization stage, the sensing stage, and the sensing reset stage; and the threshold compensation circuit is further configured to electrically disconnect a reset voltage supply line from the first node in response to control of an inactive level signal from the light emitting control line in the sensing initialization stage, the sensing stage, and the sensing reset stage.

7. A pixel driving method for a pixel driving circuit, wherein the pixel driving circuit comprises: a driving transistor, a data writing circuit, a threshold compensation circuit, a sensing circuit and a light emitting element, wherein a gate electrode of the driving transistor, the data writing circuit, and the threshold compensation circuit are connected to a first node; a second electrode of the driving transistor, the sensing circuit, the threshold compensation circuit, and the light emitting element are connected to a second node; and a first electrode of the driving transistor is connected to a first power terminal; the data writing circuit is further connected to a first control signal line and a data line; the threshold compensation circuit is further connected to a second control signal line and a reference voltage supply terminal; and the sensing circuit is further connected to a third control signal line and a sensing line, wherein the threshold compensation circuit comprises: a second transistor, a first capacitor and a second capacitor;

a control electrode of the second transistor is connected to the second control signal line, a first electrode of the second transistor is connected to the reference voltage supply terminal, and a second electrode of the second transistor is connected to the first node;

a first terminal of the first capacitor is connected to the first node, and a second terminal of the first capacitor is connected to the second node; and a first terminal of the second capacitor is connected to the second node, and a second terminal of the second capacitor is connected to a second power terminal;

the sensing circuit comprises a third transistor;

a control electrode of the third transistor is connected to the third control signal line, a first electrode of the third transistor is connected to the second node, and a second electrode of the third transistor is connected to the sensing line;

the sensing line is connected to an external sensing chip through a first switch, and is connected to an initialization voltage supply terminal through a second switch such that when the first switch and the second switch are both in an open state, the sensing line is in a floating state; when the first switch is in the open state and the second switch is in a closed state, the initialization voltage is loaded in the sensing line;

when the first switch is in the closed state and the second switch is in the open state, the sensing line is connected to the external sensing chip, so that the external sensing chip reads a voltage loaded in the sensing line; and wherein the first electrode is one of a drain electrode and a source electrode, and the second electrode is the other of the drain electrode and the source electrode;

the pixel driving method comprises:

in a display driving process, writing, by the threshold compensation circuit, a reference voltage provided by the reference voltage supply terminal to the first node and writing, by the threshold compensation circuit, a first compensation voltage to the second node in response to control of an active level signal provided by the second control signal line; writing, by the data writing circuit, the display data voltage provided by the data line to the first node in response to control of an active level signal provided by the first control signal line; writing, by the threshold compensation circuit, a second compensation voltage to the second node in response to a voltage at the first node changing from the reference voltage to the display data voltage; outputting, by the driving transistor, a corresponding current to the second node according to a voltage difference between the first node and the second node; and in a threshold voltage sensing process, writing, by the data writing circuit, a sensing data voltage provided by the data line to the first node in response to control of an active level signal provided by the first control signal line; writing, by the sensing circuit, an initialization voltage provided by the sensing line to the second node and writing, by the sensing circuit, the sensing voltage at the second node to the sensing line in response to control of an active level signal provided by the third control signal line; writing, by the data writing circuit, a reset data voltage provided by the data line to the first node in response to control of an active level signal provided by the first control signal line.

8. The pixel driving method according to claim 7, wherein the first compensation voltage is V1, the second compensation voltage is V2;

$$V1 = Vref - Vth;$$

$$V2 = V1 + (Vdata - Vref) \times \alpha$$

Vref is the reference voltage, Vth is a threshold voltage of the driving transistor, Vdata is the display data voltage, and α is a constant and 0<α<1; and α=c1/(c1+c2), c1 is a capacitance of the first capacitor, and c2 is a capacitance of the second capacitor.

9. The pixel driving circuit according to claim 7, wherein the sensing voltage is equal to a difference between the sensing data voltage and a threshold voltage of the driving transistor.

10. The pixel driving method according to claim 7, wherein the threshold voltage sensing process comprises: a sensing initialization stage, a sensing stage and a sensing reset stage;

the display driving process comprises: a pixel reset stage, a compensation stage, a data writing stage and a light emitting stage;

the pixel driving method further comprises:

in the sensing initialization stage, writing, by the data writing circuit, the sensing data voltage provided by the data line to the first node in response to control of an active level signal provided by the first control signal line, and writing, by the sensing circuit, the initialization voltage provided by the sensing line to the second node in response to control of an active level signal provided by the third control signal line;

in the sensing stage, writing, by the data writing circuit, the sensing data voltage provided by the data line to the first node in response to control of an active level signal provided by the first control signal line; outputting, by the driving transistor, a corresponding current to the second node according to the voltage difference between the first node and the second node, to charge a voltage at the second node to the sensing voltage; and writing, by the sensing circuit, the sensing voltage at the second node to the sensing line in response to control of an active level signal provided by the third control signal line, wherein the sensing voltage is equal to the difference between the sensing data voltage and the threshold voltage of the driving transistor;

in the sensing reset stage, writing, by the data writing circuit, the reset data voltage provided by the data line to the first node in response to control of an active level signal provided by the first control signal line;

in the pixel reset stage, writing, by the threshold compensation circuit, the reference voltage provided by the reference voltage supply terminal to the first node in response to control of an active level signal provided by the second control signal line; writing, by the sensing circuit, the initialization voltage provided by the sensing line to the second node in response to control of an active level signal provided by the third control signal line, in the compensation stage, writing, by the threshold compensation circuit, the reference voltage provided by the reference voltage supply terminal to the first node and writing, by the threshold compensation circuit, the first compensation voltage to the second node in response to control of an active level signal provided by the second control signal line;

in the data writing stage, writing, by the data writing circuit, the display data voltage provided by the data line to the first node in response to control of an active level signal provided by the first control signal line, and writing, by the threshold compensation circuit, the second compensation voltage to the second node in response to a voltage at the first node changing from the reference voltage to the display data voltage; and in the light emitting stage, outputting, by the driving transistor, a corresponding driving current to the second node according to the voltage difference between the first node and the second node.

11. The pixel driving method according to claim 10, further comprising: in the sensing reset stage, writing, by the sensing circuit, the initialization voltage provided by the sensing line to the second node in response to control of an active level signal provided by the third control signal line; and wherein the pixel driving method further comprises: in the pixel reset stage, writing, by the sensing circuit, the initialization voltage provided by the sensing line to the second node in response to control of an active level signal provided by the third control signal line.

12. The pixel driving method according to claim 10, wherein the pixel driving circuit further comprises: a light emitting control circuit; wherein the first electrode of the driving transistor is connected to the first power terminal through the light emitting control circuit; the light emitting control circuit is further connected to the light emitting control line;

the pixel driving method further comprises: in the pixel reset stage and the data writing stage, electrically disconnecting, by the light emitting control circuit, the first electrode of the driving transistor from the first power terminal in response to control of an inactive level signal from the light emitting control line; and the pixel driving method further comprises: in the compensation stage and the light emitting stage, writing, by the light emitting control circuit, a first operating voltage from the first power terminal to the first electrode of the driving transistor in response to control of an active level signal from the light emitting control line; and wherein the pixel driving method further comprises: in the sensing initialization stage, the sensing stage, and the sensing reset stage:

writing, by the light emitting control circuit, the first operating voltage from the first power terminal to the first electrode of the driving transistor in response to control of an active level signal from the light emitting control line; and electrically disconnecting, by the threshold compensation circuit, a reset voltage supply line from the first node in response to control of an inactive level signal from the light emitting control line.

13. A display apparatus, comprising: a display panel, wherein the display panel comprises: a pixel arrangement region and a peripheral region at a periphery of the pixel arrangement region; a plurality of pixel units are in the pixel arrangement region; each pixel unit comprises: the pixel driving circuit according to claim 1, and a light emitting element.

14. The display apparatus according to claim 13, wherein all the pixel units in the pixel arrangement region are divided into a plurality of pixel unit groups sequentially arranged along a second direction, each pixel unit group comprises pixel units sequentially arranged along a first direction, and the first direction intersects with the second direction;

each pixel unit group is configured with one corresponding first control signal line and one corresponding third control signal line; the first control signal line and the third control signal line both extend along the first direction; and the pixel units in the same pixel unit group are connected to the same first control signal line and the same third control signal line; and each pixel unit in the pixel unit group corresponds to one corresponding data line and one corresponding sensing line; the data line and the sensing line extend along the second direction; and the pixel units in different pixel unit groups and arranged along the second direction are connected to the same data line and the same sensing line.

15. The display apparatus according to claim 14, wherein the plurality of pixel unit groups comprise i×n pixel unit groups, where i and n are positive integers;

the display panel further comprises:

a first gate driving circuit in the peripheral region; wherein the first gate driving circuit and the pixel arrangement region are arranged along the first direction; the first gate driving circuit is configured with i×n first signal output terminals in one-to-one correspondence with the first control signal lines, and connected to the corresponding first control signal lines, respectively;

a second gate driving circuit in the peripheral region; wherein the second gate driving circuit and the pixel arrangement region are arranged along the first direction;

the second gate driving circuit is configured with n second signal output terminals; each second signal output terminal corresponds to i different second control signal lines, and is connected to the i corresponding second control signal lines;

a third gate driving circuit in the peripheral region; wherein the third gate driving circuit and the pixel arrangement region are arranged along the first direction; the third gate driving circuit is configured with n third signal output terminals; each third signal output terminal corresponds to i different third control signal lines, and is connected to the i corresponding third control signal lines;

an operation mode of the display apparatus comprises a sensing mode; and in the sensing mode, the first signal output terminals of the first gate driving circuit sequentially output first control signal pulses in an active level state and each with a pulse width H1', and the third signal output terminals of the third gate driving circuit sequentially output third control signal pulses in an active level state and each with a pulse width H3'; where H3'≥i×H1'; a time interval between starting times of outputting the first control signal pulses from any two adjacent of the first signal output terminals is H1'; a time interval between starting times of outputting the third control signal pulses from any two adjacent of the third signal output terminals is i×H1', and a starting time of outputting the first control signal pulse from a 1st first signal output terminal in the first gate driving circuit is the same as that of outputting the third control signal pulse from a 1st third signal output terminal in the third gate driving circuit.

16. The display apparatus according to claim 15, further comprising:

a source driving chip comprising a plurality of data voltage output terminals in one-to-one correspondence with the data lines, and connected to the corresponding data lines, respectively;

a sensing chip connected to each sensing line; and in the sensing mode, each data voltage output terminal of the source driving chip alternately outputs the sensing data voltage and the reset data voltage, and the sensing chip alternately outputs the initialization voltage to each sensing line and reads the sensing voltage through the sensing line; a total time length of outputting the sensing data voltage and the reset data voltage by the data voltage output terminal at one time is H1'; a starting time of outputting the sensing data voltage by the data voltage output terminal for the first time is the same as that of outputting the first control signal pulse by the 1st first signal output terminal in the first gate driving circuit; a starting time of reading the sensing voltage by the sensing chip through the sensing line for the first time is after the starting time of outputting the sensing data voltage by the data voltage output terminal for the first time, and an ending time of reading the sensing voltage by the sensing chip through the sensing line for the first time is not later than that of outputting the sensing data voltage by the data voltage output terminal for the first time, and a read period of reading the sensing voltage by the sensing chip through the sensing line is H1'.

17. The display apparatus according to claim 16, wherein the threshold voltage sensing process comprises: a sensing initialization stage, a sensing execution stage and a sensing reset stage;

the display driving process comprises: a pixel reset stage, a compensation stage, a data writing stage and a light emitting stage;

the data writing circuit is configured to write the sensing data voltage from the data line to the first node in response to control of an active level signal from the first control signal line in the sensing initialization stage and the sensing stage, to write the reset data voltage from the data line to the first node in response to control of an active level signal from the first control signal line in the sensing reset stage, and to write the display data voltage from the data line to the first node in response to control of an active level signal from the first control signal line in the data writing stage;

the threshold compensation circuit is configured to write the reference voltage from the reference voltage supply terminal to the first node in response to control of an active level signal from the second control signal line in the pixel reset stage and the compensation stage, and to write the first compensation voltage to the second node in the compensation stage, and to write the second compensation voltage to the second node in response to the voltage at the first node changing from the reference voltage to the display data voltage in the data writing stage; and the sensing circuit is configured to write the initialization voltage from the sensing line to the second node in response to control of an active level signal from the third control signal line in the sensing initialization stage, and to write the sensing voltage at the second node to the sensing line in response to control of an active level signal from the third control signal line in the sensing stage, the pixel driving circuit further comprises: a light emitting control circuit; wherein the first electrode of the driving transistor is connected to the first power terminal through the light emitting control circuit; and the light emitting control circuit is connected to a light emitting control line, and is configured to write a first operating voltage from the first power terminal to the first electrode of the driving transistor in response to control of an active level signal from the light emitting control line in the compensation stage and the light emitting stage, and to control the first electrode of the driving transistor to be disconnected from the first power terminal in response to control of an inactive level signal from the light emitting control line in the pixel reset stage and the data writing stage, the display panel further comprises:

a light emitting control gate driving circuit in the peripheral region; wherein the light emitting control gate driving circuit and the pixel arrangement region are arranged along the first direction; the light emitting control gate driving circuit is configured with n light emitting control signal output terminals; each light emitting control signal output terminal corresponds to i different light emitting control signal lines and is connected to the i corresponding light emitting control signal lines;

the operation mode of the display apparatus comprises a display mode; and in the display mode, the second signal output terminals of the second gate driving circuit sequentially output second control signal pulses in an active level state and each with a pulse width H2; the third signal output terminals of the third gate driving circuit sequentially output third control signal pulses in an active level state and each with a pulse width H3; the light emitting control signal output terminals of the light emitting control gate driving circuit sequentially output first light emitting control signal pulses in an inactive level state and each with a pulse width H4_1 and second light emitting control signal pulses in an inactive level state and each with a pulse width H4_2; the first signal output terminals of the first gate driving circuit sequentially output the first control signal pulses in the active level state and each with a pulse width H1; the data voltage output terminals of the source driving chip sequentially output the display data voltages required by the corresponding pixel units, and the sensing chip outputs the initialization voltages to the sensing lines;

wherein a starting time of outputting the second control signal pulse from a $1^{st}$ second signal output terminal in the second gate driving circuit, a starting time of outputting the third control signal pulse from a $1^{st}$ third signal output terminal in the third gate driving circuit, and a starting time of outputting the first light emitting control signal pulses from a $1^{st}$ light emitting control signal output terminal in the light emitting control gate driving circuit are the same; and a starting time of outputting the first control signal pulse from the $1^{st}$ first signal output terminal in the first gate driving circuit is after an ending time of outputting the second control signal pulse from the $1^{st}$ second signal output terminal in the second gate driving circuit; a time length of outputting the display data voltage from the data voltage output terminal of the source driving chip at one time is H0; the time interval between the starting times of outputting the first control signal pulses from any two adjacent of the first signal output terminals is H0; a time interval between starting times of outputting the second control signal pulses from any two adjacent of the second signal output terminals, the time interval between the starting times of outputting the third control signal pulses from any two adjacent of the third signal output terminals, and a time interval between starting times of outputting the first light emitting control signal pulses from any two adjacent of the light emitting control signal output terminals are i×H0; a time length from an ending time of the first light emitting control signal pulse to a starting time of the second light emitting control signal pulse is H4_0; H0, H2, H3, H4_0, H4_1, H4_2 and H1 satisfy: H1≥H0, H4_1=H3, H4_0+H4_1=H2 and H4_2≥H1+(i−1)×H0.

18. The display apparatus according to claim 17, wherein in the sensing mode, each of the second signal output terminals of the second gate driving circuit continuously outputs an inactive level signal; and each of the light emitting control signal output terminals of the light emitting control gate driving circuit continuously outputs an active level signal.

* * * * *